US012231842B2

(12) United States Patent
Cross et al.

(10) Patent No.: US 12,231,842 B2
(45) Date of Patent: Feb. 18, 2025

(54) PASSIVELY ASSISTED LOUDSPEAKER ENCLOSURE

(71) Applicant: ALPS ALPINE CO., LTD., Tokyo (JP)

(72) Inventors: Alan Robert Cross, Howell, MI (US); Jay Krusac, Farmington Hills, MI (US); Erich Zachariah Mellits, Washington, MI (US)

(73) Assignee: ALPS ALPINE CO., LTD., Tokyo (JP)

( * ) Notice: Subject to any disclaimer, the term of this patent is extended or adjusted under 35 U.S.C. 154(b) by 255 days.

(21) Appl. No.: 18/059,919

(22) Filed: Nov. 29, 2022

(65) Prior Publication Data

US 2023/0232150 A1 Jul. 20, 2023

Related U.S. Application Data

(60) Provisional application No. 63/300,340, filed on Jan. 18, 2022.

(51) Int. Cl.
*H04R 1/28* (2006.01)
*H04R 1/02* (2006.01)
*H04R 1/22* (2006.01)

(52) U.S. Cl.
CPC ........... *H04R 1/2834* (2013.01); *H04R 1/025* (2013.01); *H04R 1/227* (2013.01)

(58) Field of Classification Search
CPC ....... H04R 1/2834; H04R 1/025; H04R 1/227
USPC .................................. 381/335, 332, 87, 336
See application file for complete search history.

(56) References Cited

U.S. PATENT DOCUMENTS 5,952,620 A * 9/1999 Hamilton ............... H04R 1/345 181/156
10,362,386 B2 7/2019 Jaguste
10,405,090 B2 9/2019 Cross et al.
11,026,016 B2 6/2021 Sahyoun
2012/0033826 A1 2/2012 Kakumoto

FOREIGN PATENT DOCUMENTS

JP H0167897 U 5/1989
JP H02-195797 8/1990
JP H020301395 A 12/1990
(Continued)

OTHER PUBLICATIONS

Audio (Home>Loudspeakers>Multi-Way>Engineers and Physicists: Advanced Passive Radiator Discussion). Posted Aug. 4, 2004 https://as01.a.antigena.com/1/9KXZTwskTf6dthxC4mxDs8GRWQHfsvOEuH8YWUKxITrZQd4jVPb1Fri~_krSsg-q7n9pNVZbazN8TaxnC8zynQRB-FXN9Y28QJ5G7u7ku1J~YqnligsRx1hiAti-DASqQCYuZNikWPg8N~55bjGRLW-PWSSXkyn5tS6OtH2-OsvMA5eliYiaMh9WPAtTfdinNmAVQxsOXG-18 alqAx~-J9Kln4U_VUKTWn2rWG.
(Continued)

*Primary Examiner* — Thjuan K Addy
(74) *Attorney, Agent, or Firm* — Knobbe, Martens, Olson & Bear, LLP

(57) ABSTRACT

Loudspeaker enclosures that support improved acoustic radiation efficiency at low audible frequencies without compromising acoustic radiation efficiency at mid and high audible frequencies. Embodiments include enclosures having a primary chamber and a secondary chamber acoustically coupled to the primary chamber via a passive radiator. The geometrical characteristics of the secondary chamber and the corresponding air plenum are tailored for enhanced efficiency at low frequencies.

40 Claims, 18 Drawing Sheets

(56) References Cited

FOREIGN PATENT DOCUMENTS

| | | | |
|---|---|---|---|
| JP | H1141684 | A | 2/1999 |
| JP | 2005260625 | A | 9/2005 |
| JP | 5241139 | B2 | 7/2013 |

OTHER PUBLICATIONS

Extended European search report in EP Application No. EP 23151757 as mailed Jun. 19, 2023 in 10 pages.

* cited by examiner

100

103

Side cross-sectional view

Front view

Front view

Side cross-sectional view

Top cross-sectional view

Side cross-sectional view

Front view

Three Dimensional View

Side cross-sectional view

Side cross-sectional view

Top cross-sectional view

Front view

Top cross-sectional view

Top cross-sectional view

Side cross-sectional view

PASSIVELY ASSISTED LOUDSPEAKER ENCLOSURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

Various embodiments of this application relate to the field of loudspeaker design. More specifically to loudspeaker enclosure designs that provide high acoustic radiation efficiency at low frequencies without compromising acoustic radiation efficiency at mid and high frequency ranges.

Description of the Related Art

A loudspeaker is a device that converts electrical audio signals to sound waves radiated out of the loudspeaker. A loudspeaker includes one or more speaker drivers mounted on an enclosure designed to improve acoustic radiation efficiency and the spectral fidelity of the radiated sound waves. The speaker driver converts electrical audio signals to sound waves, radiates a portion of the soundwaves away from the enclosure and another portion into the enclosure. The enclosure sustains and filters the internally radiated portion of the sound waves and radiates them out of the enclosure via an opening or using a passive radiator. The design of the enclosure can significantly affect the acoustic radiation efficiency in particular at low audio frequencies.

SUMMARY

A loudspeaker configured to generate sound waves. The loudspeaker includes a primary chamber having at least one speaker driver that generates sound waves, radiates a first potion of sound waves away from the primary chamber, and radiates a second portion of the sound waves into the primary chamber, where first portion of sound waves includes fundamental output sound waves. The loudspeaker includes at least one passive radiator having an effective area configured to radiate intermediate sound waves associated with the second portion of the sound waves, and at least one secondary chamber that is acoustically coupled to the primary chamber via the at least one passive radiator. The secondary chamber includes at least one output port having an output area where the output port is configured to allow radiation of intermediate sound waves received from the passive radiator out of the secondary chamber and away from the loudspeaker. The at least one secondary chamber is configured to increase an acoustic output power of the loudspeaker by at least 5 dB in a low frequency range compared to another loudspeaker not having the at least one secondary chamber but otherwise identical to the loudspeaker, where the low frequency range comprises frequencies lower than a center frequency of the fundamental output sound waves.

BRIEF DESCRIPTION OF THE DRAWINGS

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

DETAILED DESCRIPTION

Figure 1B:
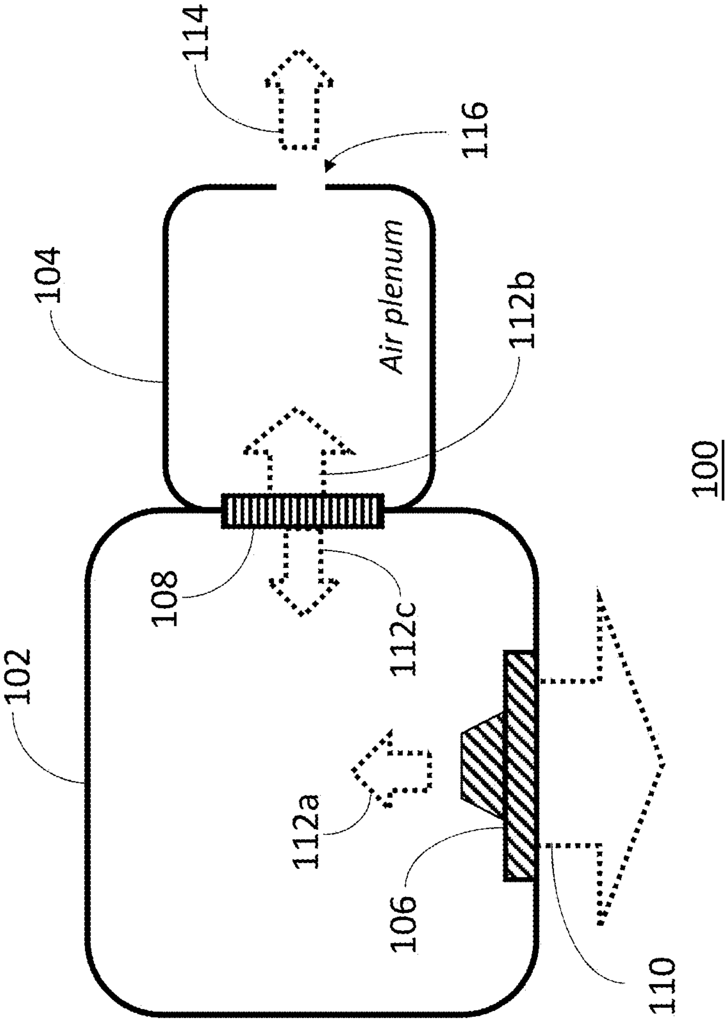
FIG. 1B is a schematic diagram illustrating a loudspeaker enclosure having a primary and a secondary chamber acoustically connected via a passive radiator in accordance with certain embodiments described herein.

The primary function of loudspeaker is to convert electric signals received from an electronic system (e.g., an audio amplifier) to sound waves having nearly the same spectral characteristics as the original sound. A loudspeaker comprises at least one electro-acoustic transducer (referred to as active transducer or speaker driver) and an enclosure on which the speaker driver is mounted. The enclosure enhances the fidelity (e.g., spectral fidelity) of sound produced by the loudspeaker compared to sound produced by the speaker driver in the absence of the enclosure.

The enclosure prevents sound waves generated by a back surface of the diaphragm of the speaker driver interacting with sound waves generated by the front surface of the diaphragm that may be out of phase with each other and thereby distort the resulting sound waves. As such an enclosure at least include a baffle (e.g., a front surface on which the speaker driver is mounted), a closed box, a vented box, or the like. Additionally, the enclosure may serve as an acoustic resonator that sustains the sound waves generated by the speaker driver. As such the volume and stiffness of the air mass in the enclosure may directly affect the performance of the loudspeaker. As a resonator, the enclosure may tailor the spectral acoustic power distribution of at least a portion of soundwaves generated by the speaker driver that are radiated via the enclosure. As such, enclosure design and configuration is an integral part of manufacturing loudspeakers with desired fidelity.

It may be advantageous for a loudspeaker to produce a full range (e.g., covering low, mid and high frequency ranges) of audio response. A main challenge in loudspeaker design is maintaining the acoustic power generation and radiation efficiency within a frequency range while improving the performance in another frequency range (e.g., a non-overlapping or partially overlapping frequency range).

A challenge in loudspeaker design is to design a system that can simultaneously deliver high output at a low frequency range (e.g., below 70 Hz) and a high frequency range (e.g., above 800 Hz).

Given that the reproduction of low frequency sound is usually more difficult compared to high frequency sound, a major aspect of an enclosure design is improving generation and/or radiation of low frequency sound with minimal impact on the spectral content and output acoustic power of the fundamental output sound waves directly output by the speaker driver (e.g., in mid and high frequency range). Some loudspeaker systems use ported or vented enclosures or passive radiators (also referred to as passive transducers) to enhance the performance of the corresponding loudspeaker.

A vented enclosure may have a vent or an opening tube or tube-like structure connected to the opening to improve low-frequency output, increase efficiency, or reduce the size of an enclosure.

Using a passive radiator for radiating low frequency sound waves out of the enclosure may increase low-frequency efficiency of the loudspeaker while allowing the enclosure to be smaller than a vented loudspeaker with a similar performance.

A passive radiator is effectively a speaker without the electro-acoustic transducer. In some cases, a passive radiator may comprise a cone (or diaphragm), one or more suspensions (e.g., a spider), and a frame. In contrast to the speaker driver, passive radiator does not include a coil for converting electrical signals to the vibration of the cone. A passive radiator may receive primary sound waves (e.g., sound waves generated by a speaker driver) from one side of the cone and re-radiate secondary sound waves from the opposite side of the cone. A passive radiator system is excited by the sound pressure in the enclosure and can be configured to create the low-frequency sound waves (e.g., basslines). A passive radiator may have an effective area through which sound is radiated out of the enclosure or, in some cases, to a chamber of the enclosure that is acoustically coupled to a main chamber of the enclosure to which the speaker driver is connected. The effective area of the passive radiator may have a circular, oval, elliptical, or a square-like shape. In some cases, the effective area of the passive radiator may comprise other shapes. In some cases, the effective area of the passive radiator comprises the standard $S_d$ rating of the passive radiator. In some examples, the effective area of the passive radiator may comprise an area of (e.g., a projected area) of the cone of the passive radiator. For example, when the radius of the cross-section of the cone at the output plane of the PR is R (including half of the roll or surround), the effective area is $\pi R^2$.

The frequency response of a passive radiator (PR) may comprise a resonant behavior associated with a resonant frequency of the PR. The resonant frequency of the PR may be determined based at least in part by the mass and or a shape of cone/diaphragm and/or properties of the suspensions. Additionally, the resonant frequency of the PR may be affected by the stiffness of the air in the vicinity of the PR. For example, stiffness of air in an enclosure from which the PR receives the primary sound waves, stiffness of the air outside of the enclosure (that is in contact with an external portion of the passive radiator), or stiffness of air in a chamber of the enclosure to which the PR radiates the secondary sound waves.

The resonant frequency of a PR may tuned by varying its mass (e.g., by adding mass to the cone). Alternatively, the PR may be tuned by varying the stiffness of air in contact with the PR (referred to as "loading" effect"). For example, the resonant frequency of a PR may be down tuned (i.e., reduced) by adding mass to its cone, or increasing the stiffness of air in a chamber to which PR radiates the secondary sound waves and/or from which the PR receives the primary sound waves.

As mentioned above, usually there is a tradeoff between efficiency bandwidth (e.g., a bandwidth within which sound waves are generated with highest efficiency) and the fidelity within the bandwidth. In many cases a loudspeaker enclosure designed to efficiently produce low frequency sound waves (e.g., below 70 Hz) based on low frequency content of the corresponding electric signal, may not efficiently produce high frequency (e.g., 800 Hz and above) or mid frequency sound waves due to design constraints imposed by the size and mass of the speaker driver. For example, such loudspeaker enclosure may not be able to generate acoustic waves having SPLs of about 95 dB or above at high frequencies.

Some of the disclosed systems and methods may use an air plenum (e.g., a volume of air enclosed in a chamber) configured to load the passive radiator and restrict the air movement in an otherwise conventional enclosure, to overcome this tradeoff, improve the sound pressure levels (SPLs)

of the generated low frequency sound waves (e.g., from 3 dB to 6 dB, from 6 dB to 9 dB, from 9 dB to 12 dB or any range formed by these values), and thereby increase the low frequency performance of the corresponding loudspeaker. As such, the proposed loudspeaker enclosure designs may provide enhanced acoustic radiation efficiency compared to a similar size loudspeakers without the air plenum both at low and high frequencies. Using these designs a loudspeaker may generate sound with higher SPLs without requiring more input power while maintaining the fidelity of the output sound. The passively assisted loaded acoustic chamber may tune the low frequency to extreme low frequency output without a penalty on the overall acoustic power efficiency, allowing for an active low frequency transducer to be designed for higher efficiency.

In some embodiments, by allowing the usage of a high efficiency transducer in an enclosure having an air plenum and passive radiator, the disclosed loudspeaker enclosure designs may allow maintaining high output levels at high frequencies while increasing low frequency (LF) output by at least 3 dB to 6 dB, 6 dB to 9 dB, 9 dB to 12 dB or any range formed by these values. As such, the loudspeaker described below may generate sound with high efficiency and high fidelity.

Additionally, the proposed designs may protect the loudspeaker assembly from certain environmental conditions (e.g., moisture) that would otherwise damage the transducer, e.g., by causing corrosion on the backside of a transducer where the fragile components such as voice coil/metalware are exposed.

In some embodiments, a loudspeaker enclosure having two compartments or chambers including an air plenum configured to enhance the low-frequency response of the speaker driver and increasing the output power acoustic power and efficiency at low frequencies are disclosed.

In some embodiments, the loudspeaker enclosure may include a primary chamber having a main port or opening on which at least one speaker driver is disposed and a secondary chamber that is acoustically coupled to the primary chamber via one or more passive radiators. The secondary chamber and the one or more passive radiator are configured to allow high efficiency acoustic power transfer from the speaker driver to the secondary chamber at low frequencies (e.g., frequencies lower than 70 Hz) and efficient acoustic power radiation from one or more output ports of the secondary chamber. The secondary chamber and the passive radiator may be configured to improve the low frequency performance (e.g., acoustic power generation and radiation efficiency), with negligible impact on the acoustic power and spectral properties of an active output (also referred to as fundamental sound waves) directly radiated by the one or more speaker drivers away from the loudspeaker. In some cases, the fundamental sound waves may comprise sound waves having frequencies with in high and/or middle frequency ranges.

The speaker driver may be mounted to a wall (e.g., a front wall) of the primary chamber such that a front face of the speaker driver is external to the primary chamber and a rear face of the speaker driver is internal to the primary chamber.

Figure 1A:
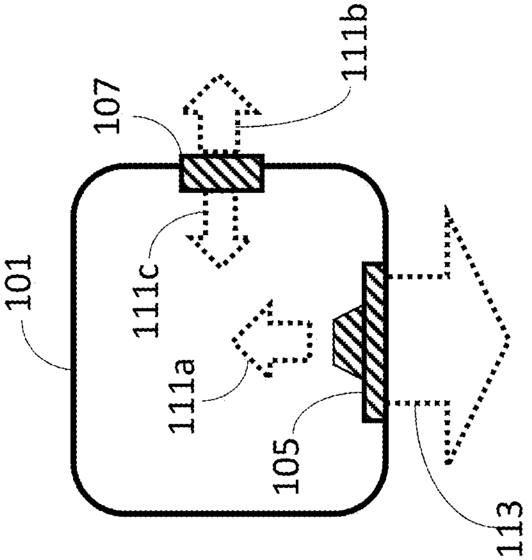
Prior Art FIG. 1A
FIG. 1A is a schematic diagram illustrating a loudspeaker enclosure with a single chamber.

FIG. 1A is a schematic diagram illustrating an example conventional loudspeaker 103 having an enclosure comprising a single chamber 101 formed by multiple walls. In some cases, the chamber 101 may comprise a cuboid formed by a front wall, a back wall, two sidewalls, a top panel and bottom panel. In some other cases, the chamber 101 may comprise other shapes and forms. The chamber 101 may have a first opening on the front wall and a second opening on a sidewall, or other walls or panels. In some implementations, a passive radiator (PR) 107 may be disposed on or within the second opening of the chamber 101. The loudspeaker 103 may comprise a speaker driver 105 mounted to a front wall of the chamber 101 within the first opening. The speaker driver 105 may be mounted on the front wall such that a front face of the speaker driver 105 is external to the chamber 101 and a rear face of the speaker driver 105 is internal to the chamber 101. The speaker driver 105 may comprise an active acoustic transducer (e.g., an electro-acoustic transducer) that converts electric signals to sound waves.

In some cases, the speaker driver 105 may have a diaphragm (or cone) that generates the sound waves. A forward-facing surface of the diaphragm may generate active sound output 113 and radiate it away from the chamber 101. Active sound output 113 may comprise fundamental output sound waves having frequencies within an operational frequency band of the active speaker driver 105. In various implementations, an active speaker driver (e.g., the active speaker driver 105) may comprise a tweeter, midrange driver, woofer, or subwoofer. Accordingly, the operational frequency band of the speaker driver can be from 500 Hz to 5 KHz, from 100 Hz to 1 KHz, from 20 Hz to 200 Hz, or any ranges formed by these values, or larger or smaller.

The operational frequency band of an active speaker driver may include a center frequency in the middle of the operational frequency band. In some cases, a low frequency range with respect to a speaker driver may comprise frequencies smaller than the center frequency of the operational band of the speaker driver. In some cases, the center frequency of the fundamental output sound waves can be from 20 Hz to 40 Hz, from 40 Hz to 100 Hz, from 100 Hz to 1000 Hz, from 1000 Hz to 5000 Hz.

A speaker driver may have frequency response comprising a spectrum of the fundamental output sound waves. The frequency response may comprise a peak response frequency (also referred to as resonant frequency), and a frequency bandwidth. In some cases, the amplitude/power of the sound waves output by a loudspeaker at the peak response frequency can be larger than sound waves output at other frequencies within the frequency bandwidth. In some cases, the operational frequency band of a loudspeaker may comprise the frequency bandwidth of the speaker driver.

A rearward-facing surface of the diaphragm may generate secondary sound waves 111*a* inside the chamber 101. The passive radiator (PR) 107 may be configured to receive the secondary sound waves 111*a* and radiate at least a portion of corresponding acoustic power away from the chamber 101 as passive sound output 111*b*. Similar to the active driver 105, PR 107 may comprise an operational frequency band, a center frequency (in the middle of the operational frequency band), a frequency bandwidth, and a peak response frequency. In some cases, the operational frequency band may comprise the frequency bandwidth. In some examples, the passive sound output of the loudspeaker 103 may comprise secondary output sound waves 111*b* that are excited by the secondary sound waves 111*a* output by the speaker driver 105, and sustained by the chamber 101. In some cases, the frequency content of the active sound output 113 and the passive sound output 111*b* may be different. For example, the amplitude of most low frequency components (e.g., frequencies below a center frequency of the active sound output 113) of the passive sound output 111*b* can be larger than those of the active sound output 113. In some cases, the primary active sound output 113 may comprise a high-frequency output of the loudspeaker 103 (e.g., frequencies larger than the center frequency of the active speaker driver 105) and the secondary output sound waves may comprise a low-frequency output of the loudspeaker 103 (e.g., frequencies smaller than the center frequency of the active speaker driver 105). The chamber 101 may serve as an acoustic resonator that together with the PR 107 function as a low-pass filter (or a band pass filter with low center frequency). As such, the acoustic power spectrum of the passive sound output 111*b* may be determined by the characteristics (e.g., acoustic and geometrical characteristic) of the PR 107 and the chamber 101 (e.g., size, shape, material, and the like). In some cases, the acoustic response of the PR 107 (e.g., the frequency response, acoustic impedance, and the like), may depend on the geometrical and structural characteristics of the PR 107 or the characteristics of the corresponding cone/diaphragm, or suspensions of the PR 107. In some examples, a frequency response of the PR 107 and thereby the spectral characteristics of the secondary sound output 111*b* may be tuned or adjusted by changing the mass (or an effective mass) of the diaphragm the PR 107. For example, the effective mass of the diaphragm may be increased by adding mass to the diaphragm, to down tune or decrease a peak response frequency and/or a center frequency of the PR 107. In some cases, decreasing the peak response frequency and/or the center frequency of the PR 107, may improve the acoustic output power at a lower end of the bandwidth or operational frequency range of the PR 107.

In various embodiments, down tuning the peak response frequency and/or the center frequency of the PR 107 may increase the acoustic output power of the loudspeaker 103 at a lower end of the bandwidth or operational frequency range of the PR 107, or at a lower end of an overall operational frequency range of the loudspeaker 103, but also increase acoustic loss at a middle and/or higher end of the bandwidth or operational frequency range of the PR 107, or at a middle and/or a higher end of an overall operational frequency range of the loudspeaker 103.

Some of the loud speaker enclosure designs and loudspeaker configurations disclosed here, may improve the output acoustic power (also referred as output power) of a loudspeaker at a lower end of an overall operational frequency range of a loudspeaker with negligible impact on the acoustic power radiated at frequencies in middle or higher end of the overall operational frequency range of the loudspeaker. In some embodiments, an air plenum may be added to the loudspeaker 103 to down tune the frequency of the PR 107 and improve a low frequency response of the loudspeaker 103. In some examples, the air plenum may comprise a secondary chamber acoustically coupled to the chamber 101 of the loudspeaker 103 (e.g., via a passive radiator).

FIG. 1B is a schematic diagram illustrating a loudspeaker 100 in accordance with certain embodiments described herein. The loudspeaker 100 may have an enclosure comprising two chambers, a primary chamber 102 and a secondary chamber 104 acoustically coupled to the primary channel 102. The primary chamber 102 may comprise one or more features described above with respect to chamber 101. The secondary chamber 104 may comprise an air plenum having a volume formed by multiple walls, surfaces, and/or panels. A speaker driver 106 connected to primary chamber 102 may be configured to generate sound waves, radiate a first portion of the sound waves as fundamental output sound waves 110 away from the loudspeaker 100, and a second portion of the acoustic waves as secondary sound waves 112*a* inside the chamber 102. In some cases, the speaker driver 106 may be mounted on or within a first opening of the primary chamber 102.

In some examples, the a secondary chamber 104 may be acoustically coupled to the primary chamber 102 via a passive radiator (PR) 108 mounted on or within a second opening on a portion of a wall or surface shared between the primary chamber 102 and the secondary chamber 104 (herein referred to as a "joint wall"). The PR 108 can be configured to receive the second portion of the sound waves 112*a* radiated by the speaker driver 106 inside the primary chamber 102, or sound waves excited by the second portion of the sound waves 112*a*, and radiate intermediate sound waves 112*b* into the secondary chamber 104. The secondary chamber 104 may comprise an output port 116 configured to radiate the intermediate sound waves 112*b* radiated by the PR 108, out of the secondary chamber 104 as a passive sound output 114 of the loudspeaker 100.

In some implementations, the active sound output 110 (also referred to as fundamental output sound waves) may comprise one or both of a high-frequency and a mid-frequency output of the loudspeaker 100, and the passive sound output 114 may comprise a low-frequency output of the loudspeaker 103.

The primary chamber 102 may serve as an acoustic resonator that together with the PR 108 function as a low-pass filter (or a band pass filter with low center frequency). As such, the frequency content of the intermediate sound waves 112*b* may be at least determined by the characteristics the primary chamber 102 (e.g., size, shape, material, and the like) and the PR 108. Additionally, the frequency content of the intermediate sound waves 112*b* may be determined by the characteristics (e.g., size, shape, material, and the like) of the secondary chamber 104. Similar to PR 107, the acoustic response of the PR 108 (e.g., peak response frequency, operational frequency range, the frequency response, acoustic impedance, and the like), may depend on the geometrical and structural characteristics of the PR 108 or a membrane of the PR 108.

The secondary chamber 104 (or the "air plenum") may serve as an acoustic load for the PR 108 and thereby affect the frequency response of the PR 108 as well as the efficiency of acoustic power transfer from the primary chamber 102 to the secondary chamber 104 at different frequencies. Moreover, the secondary chamber 104 may improve the radiation efficiency of sound waves out of the loudspeaker 100 via PR 108 within one or more frequency ranges (e.g., low-frequency range), compared to a corresponding radiation efficiency of sound waves out of loudspeaker 103 via PR 107 (in the in the absence of the secondary chamber 104).

The plenum air mass (a volume of air in the secondary chamber 104) that is in contact and interacts with the PR 108 may lower an acoustic tuning of the PR 108. Similar to added mass to a passive radiator, the air plenum may change the spring constant and/or stiffness of the cone or membrane of the PR 108; however, the air plenum may provide a larger acoustic power radiation efficiency (low-frequency efficiency, overall efficiency, or both) improvement compared to added mass. As opposed to added mass to the PR 108, the plenum air mass may lower the tuning of the loudspeaker 100 without reducing the acoustic power radiation efficiency. In some cases, the plenum air mass may align a phase or frequency of the PR 108 with that of the speaker driver 106 at low audio frequencies and thereby enhance the low frequency performance of the loudspeaker.

In some cases, the secondary chamber 102 may comprise an elongated chamber extending along a longitudinal direction, having a length in the longitudinal direction and a cross-sectional area in a plane perpendicular to the longitudinal direction. In some cases, to improve the low-frequency and overall acoustic power radiation efficiency of a loudspeaker, a size of the cross-sectional area of the secondary chamber 104 may be constrained by a size of the effective area of the PR 108. In some examples, the cross-sectional area of the secondary chamber, along the longitudinal direction, may not exceed 30% or 38% of the effective area of the PR 108. Additionally, in some examples, the volume of the secondary chamber may be minimized while keeping the cross-sectional area of the secondary chamber larger than 5% of the effective area of the PR 108. In some examples, an area of the output port 116 may be substantially equal to the cross-sectional area of the secondary chamber 104 at the output port 116. In some, examples, the area of the output port 116 can be smaller than the cross-sectional area of the secondary chamber 104 and larger than 5% of the effective area of the effective area of the PR 108. In various embodiments, the area of the output port 116 may be larger than 5% of the effective area of the PR 108 but not larger than 38% of the effective area of the PR 108. In some embodiments, one or both of the area of the output port 116 and the cross-sectional area of the secondary chamber can be from 5% to 20%, from 20% to 25%, from 35% to 30%, from 30% to 38%, or any range formed by these ranges. The area of the output port 116 can be an area defined by a boundary of an opening through which sound waves are radiated out of the secondary chamber 104.

In some embodiments, the effective area of the passive radiator (PR 108) is larger than 130%, or 200% of an area (e.g., an effective area) of the speaker driver 106. The effective area of the speaker driver 106 may include an area through which sound is radiated out of the first chamber 102. In some examples, the effective area of the speaker driver 106 may comprise an area of (e.g., a projected area) of a cone of the speaker driver 106. For example, when the radius of the cross-section of the cone at the output plane of the speaker driver 106 is R (including half of the roll or surround), the effective area is $\pi R^2$. In some examples, the effective area of the speaker driver 106 may be determined similar to the effective area of a passive radiator and based on an effective diameter as described below with respect to FIG. 14.

The frequency response of a given PR 108 and the efficiency of acoustic energy transfer from the speaker driver 106 to the secondary output sound waves 114 may be tuned or tailored by tailoring the geometry (e.g., shape, size, volume) of the secondary chamber 104 and the geometry of an output port 116 of the secondary chamber 104 through which the secondary output sound waves 114 are radiated out of the chamber 104. In some cases, the geometry of the secondary chamber 104 may include the cross-sectional area or variation of the cross-sectional area along a longitudinal direction. In some cases, the cross-sectional area of the secondary chamber may not vary along the longitudinal direction or along an acoustic path from the PR 108 to the output port 116. In these cases, the area of the output port 116 may be substantially equal to the cross-sectional area of the secondary chamber 104.

In some examples, an air plenum (e.g., a secondary chamber 104) having a longer length may improve the low frequency of the corresponding loudspeaker more than an air plenum (e.g., a secondary chamber 104) having a shorter length. In various implementations, a cross-section area of the secondary chamber 104 in a plane perpendicular to an acoustic path along the secondary chamber 104 (e.g., from the PR 108 to the output port 116), can be from 5% to 10%, from 10% to 20%, from 20 to 30%, from 30% to 38% of the effective area of the PR 108 (e.g., the standard $S_d$ rating of the passive radiator).

In various implementations, the geometrical properties (e.g., volume, cross-sectional area, and the like) of the secondary chamber 104 may be determined based at least in part on the volume of the primary chamber 102, the characteristics (e.g., size, frequency response, and the like) of the speaker driver 106, and characteristics of the PR 108.

In some cases, the area of the output port 116 of the secondary chamber 104 may be determined based at least in part on the area or an effective area of the PR 108. For example, the area of the output port 116 may be less than 38%, 30%, or 20% of the effective area of the PR 108. In some such embodiments, the area of the output port 116 may be greater than 15%, 10%, or 5% of the effective area of the PR 108.

In some embodiments, the minimum area of the output port 116 may be determined based on: the overall size of the PR 108, and an upper limit for the loudness of the speaker (e.g., quantified as SPL). For example, for a very high excursion speaker that operates at high SPL of 95 dB or larger, the minimum area of the opening may be large enough to avoid air rush noise. As such, in some implementations, a lower limit for the area of the output port 116 of a speaker may be determined based at least in part an upper limit for the loudness range of the speaker.

In some cases, an area of less than 5% of the PR 108 for the output port 116 may result in air rush noise, and other effects that reduce the quality of the sound reproduced by the loudspeaker 100. In some examples, an area of less than 5% of the PR 108 for the output port 116 may result in mechanical contact (e.g., collision) between the membrane of the PR 103 and a surface of the air plenum.

In various implementations, the secondary chamber 104 may increase an acoustic output power of the loudspeaker 100 by at least 3 dB, at least 4 dB or at least 5 dB, within a low frequency range compared to the loudspeaker 101 not having the at least one secondary chamber but otherwise identical to the loudspeaker. The acoustic output power of the loudspeaker 100 may comprise an acoustic power of the active sound output 110 and an acoustic power of the passive sound output 114. In some examples, the secondary chamber 104 may increase an acoustic output power generated by the loudspeaker 100 within a low frequency range compared that of the loudspeaker 103, not having the at least one secondary chamber but otherwise identical to the loudspeaker, by 3 dB, 4 dB, 5 dB, 7 dB, 9 dB, 3 dB, or values between these values or larger.

In some embodiments, the primary chamber 102 may comprise a cuboid having two sidewalls, a back wall, a front wall, a top panel, and a bottom panel. In some cases, the secondary chamber 104 may comprise a cuboid having at least two sidewalls, a bottom panel, and a top panel where the bottom panel of the primary chamber 102 comprises the top panel of the secondary chamber 104 and serves as the "joint wall". The primary chamber 102 may have a first opening on its front wall and at least a second opening on the bottom panel. The speaker driver 106 may be mounted to the front wall of the chamber 102 within the first opening. A front face of the speaker driver 106 is external to the chamber 102 and a rear face of the speaker driver 106 is internal to the chamber 102. The speaker driver 106 may comprise an active acoustic transducer (e.g., an electro-acoustic transducer) that converts electric signals to sound waves. In some cases, the speaker driver 106 may have a diaphragm that generates the sound waves. A forward-facing surface of the diaphragm may generate active sound output 110 and radiate them away from the chamber 102. A rearward-facing surface of the diaphragm may generate secondary sound waves 112*a* inside the chamber 102. The PR 108 may disposed or mounted within a second opening on a portion of the bottom panel of the primary chamber that is shared with secondary chamber 104 as its top panel.

Some of the advantages of including the secondary chamber 104 (the plenum air mass placed over the PR 108) that is acoustically coupled to the primary chamber 102 may include:

1. The plenum air mass (air trapped in the secondary chamber 104) lowers the acoustic tuning of the passive radiator 108 without reducing the overall output of the loud speaker 100.
2. The plenum air mass helps align the frequency response of the speaker driver 100 and the passive radiator 108 at low frequencies. In some cases, the alignment may comprise a phase alignment that enhances the low-frequency performance of the loudspeaker 100 compared to a loudspeaker (e.g., the loudspeaker 103) with passive radiator but without the plenum air mass. In some cases, the alignment may comprise a frequency response or resonant frequency alignment, which allows more efficient energy transfer from the speaker driver 106 to the passive radiator 108.

Additionally, the secondary chamber 104 and the passive radiator 108 may protect the loudspeaker assembly from environmental conditions that would cause transducer failures such as water, corrosion on the backside of a transducer where the fragile components such as voice coil/metalware are exposed. The secondary chamber 104 may also protect the components (e.g., the cone or the suspension) of the passive radiator 108 from extreme environments.

In some cases, the PR 108 may form a “permeable seal” between the primary chamber 102 and the secondary chamber 104. In some cases, when the PR 108 forms the permeable seal, any air that escapes out of the primary chamber 102 may travel through a membrane or diaphragm of the PR 108; in other words there may be no gap between the PR 108 and an opening on the joint wall shared between the primary chamber 102 and the secondary chamber 104. In some cases, the diaphragm of the PR 108 may comprise a material that allows a small amount of air to be exchanged between the primary chamber 102 and the secondary chamber 104 and in the meantime make the air inside the primary chamber 102 “stiffer” or “less free to move”. In some cases, a permeable seal may allow the pressure inside the primary chamber 102 to be equalized with an external pressure (e.g., atmospheric pressure outside the primary chamber). For example, when the temperature of the primary chamber 102 changes, airflow via the permeable seal equalizes the pressure within the primary chamber 102 with the pressure in the secondary chamber 104 and thereby with the atmospheric pressure. In some embodiments, the permeable seal may comprise a membrane that blocks water and particles (e.g., dust particles) while allowing air flow between the primary chamber 102 and the secondary chamber 104.

In some embodiments, the secondary chamber 104 may comprise multiple compartments. In other words, the plenum air mass can be divided into two or more masses of air and the designs are not limited to a single volume of air mass. In some cases, the secondary chamber 104 may comprise air pipes or other shaped tubes configured to provide an output for radiating sound waves (e.g., low frequency sound waves) at a desired location or a desired distance from the primary chamber.

In some embodiments, the stiffness of the PR 108 may be selected or adjusted to provide optimal performance at low frequencies. For example, the stiffness of the PR 108 can be adjusted according to an intended response (e.g., spectral response) of the loudspeaker 103. In some cases, the stiffness of the PR 108 may be selected or adjusted based at least in part of the characteristics of the primary chamber 102 and/or the secondary chamber 104.

Figure 2A:
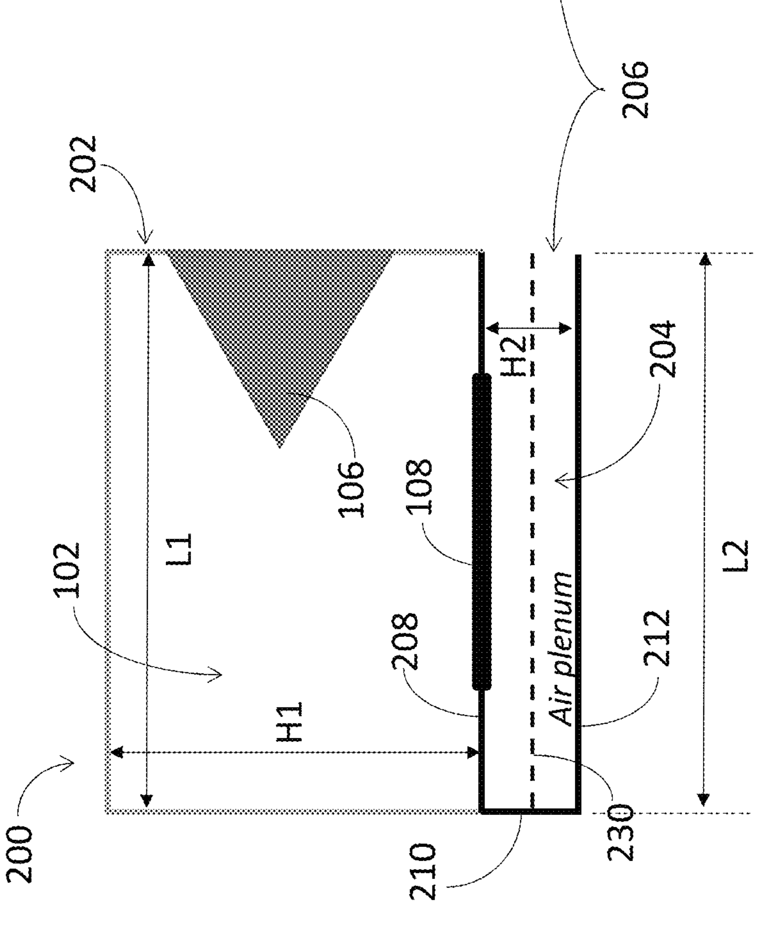
FIG. 2A-2B illustrate side cross-sectional view (A) and front view (B) of an example loudspeaker enclosure comprising a primary chamber and a short secondary chamber in accordance with certain embodiments described herein.
Figure 2B:
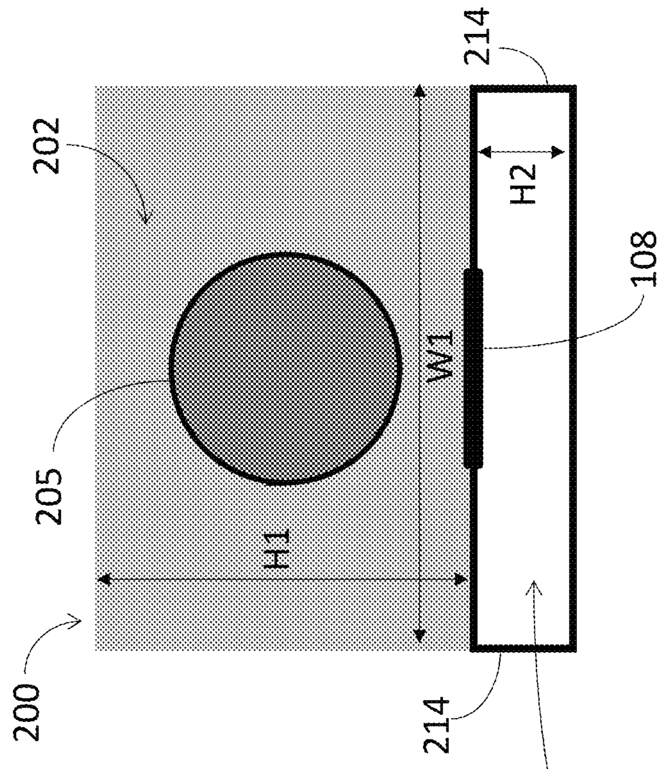

FIG. 2A-2B illustrate side cross-sectional view (A) and front view (B) of an example loudspeaker 200 in accordance with certain embodiments described herein. The loudspeaker 200 has an enclosure comprising a primary chamber 102 and a secondary chamber 204 (also referred as air plenum) that shares a join wall 208 with the primary chamber 102. The primary chamber 102 may comprise a cuboid having a length L1, a height H1, and a width W1. A speaker driver 106 may be mounted within a first opening 205 on a front wall 202 of the primary chamber 102 and a PR 108 may be mounted within a second opening on the joint wall 208. The PR 108 may acoustically couple the primary chamber 102 to the secondary chamber 204. The secondary chamber 204 may comprise an open ended cuboid formed by the joint wall 208, a back wall 210, two side walls 214, and a bottom panel 212. The open end of the cuboid serves as the output port 206 of the secondary chamber 204. The secondary chamber 204 may have a height H2, and a length and a width substantially equal to L1 and W1 respectively. In some embodiments, H2 can be smaller than H1. In some embodiments, the back wall 210, and the sidewalls of the secondary chamber 204 can be parallel to and aligned with, the back wall and the sidewalk of the primary chamber 102 respectively, forming continuous flat surfaces of a back wall, and the sidewalls of the speaker 200. The output port 206 may have an area of H2×W1 through which the secondary output sound waves are radiated out of the loudspeaker 200.

In various embodiments, H2 may be tailored based at least in part on values of L1, W1, H1 and the geometry and characteristics of the speaker driver 106 and PR 108 the effective area of the PR 108), In some cases, the cross-sectional area (H2×W1) of secondary chamber 102 and/or the output port 206 may be less than 38%, 30%, or 20%, but larger than 5%, of the effective area of the PR 108.

Figures 3A, 3B:
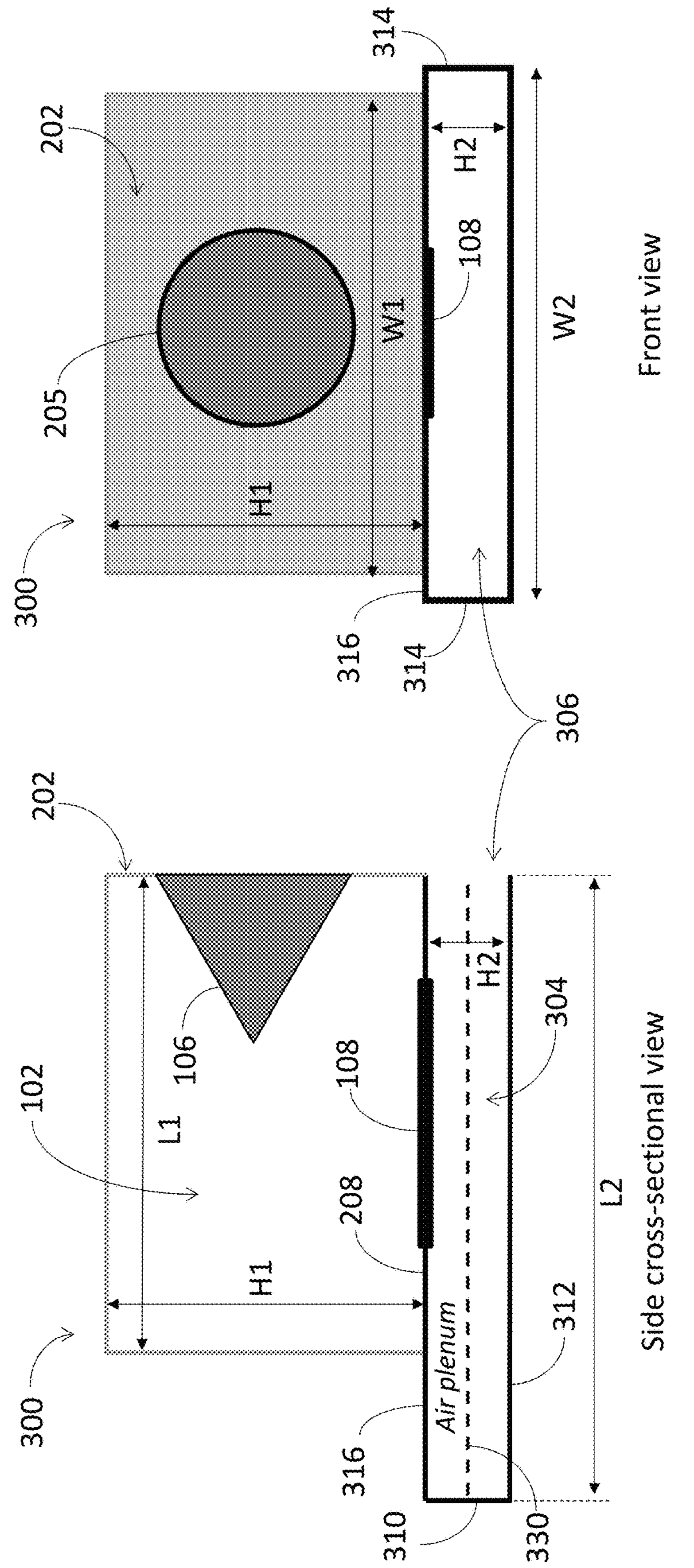
FIG. 3A-3B illustrate side cross-sectional view (A) and front view (B) of an example loudspeaker enclosure comprising a primary chamber and a long secondary chamber in accordance with certain embodiments described herein.

FIG. 3A-3B illustrate side cross-sectional view (A) and front view (B) of an example loudspeaker 300 having an enclosure comprising a primary chamber 102 and a long secondary chamber 304 that shares a join wall 208 with the primary chamber 102, The enclosure of the loudspeaker 300 may have features similar features described above with respect to the loudspeaker 200, The primary chamber 102 may comprise a cuboid having a length L1, a height H1, and a width W1. A speaker driver 106 may be mounted within a first opening on a front wall 202 of the primary chamber 102 and a PR 108 may be mounted within a second opening on the joint wall 208. The PR 108 may acoustically couple the primary chamber 102 to the secondary chamber 304. The secondary chamber 304 may comprise an open-ended cuboid formed by a top panel 316 that comprise the joint wall 208, a back wall 310, two side walls 314, and a bottom panel 312. The open end of the cuboid serves as the output port 306 of the secondary chamber 304. The secondary chamber 304 may have a length L2, a width W2, and a height H2. In some embodiments, L2 and W2 can be larger than L1 and W1 respectively, and H2 can be smaller than H1. The output port 306 may have an area of H2×W2 through which the passive output sound waves are radiated out of the loudspeaker 300.

In various embodiments, the L2, W2, and H2 may be tailored based at least in part on values of L1, W1, H1, and characteristics of the speaker driver 106 and PR 108. In some cases, the area (H2×W2) of the output port 306 may be less than 38%, 30%, 20%, but larger than 5% of the area or effective area of PR 108.

Figure 4B:
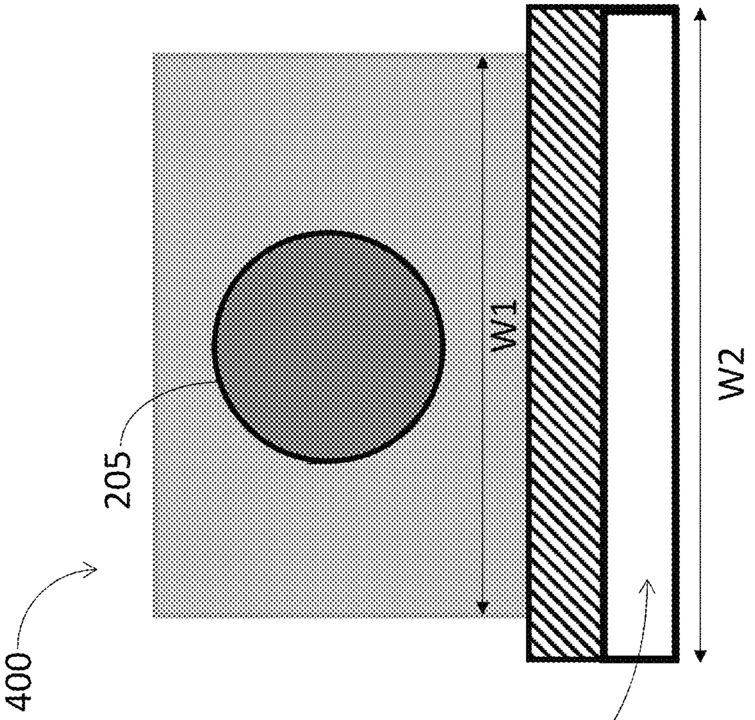
FIG. 4A-4B illustrate side cross-sectional view (A) and front view (B) of an example loudspeaker enclosure comprising a primary chamber and a folded secondary chamber in accordance with certain embodiments described herein.
Figure 4A:
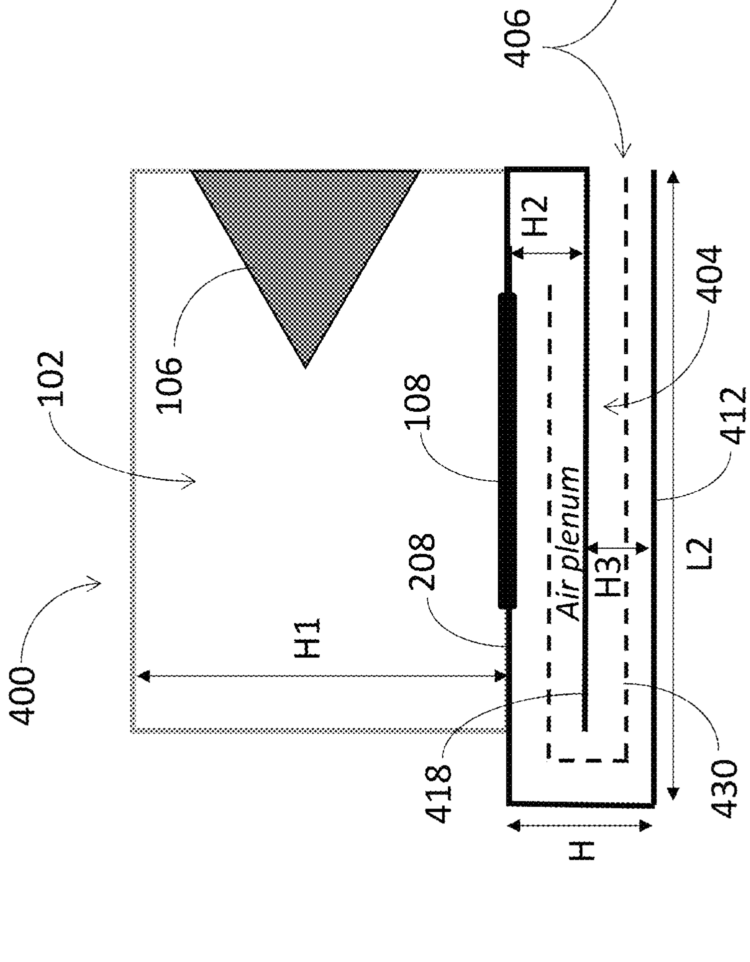
Figure 5B:
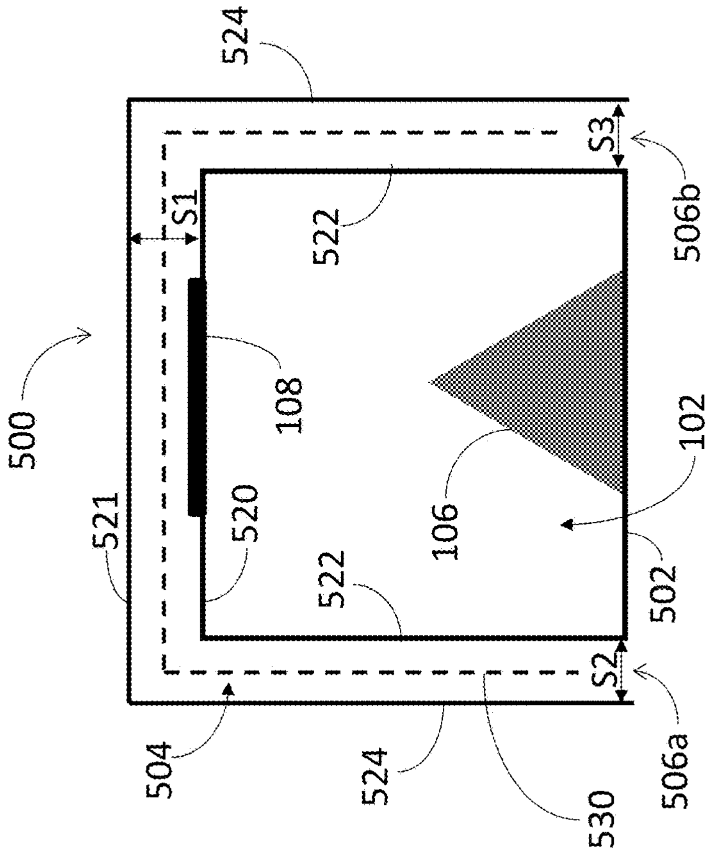
FIG. 5A-5D illustrate a side cross-sectional view (A), a top cross-sectional view (B), a front view (C), and a three dimensional view (D) of an example loudspeaker enclosure comprising a primary chamber and a secondary chamber surrounding the primary chamber and having two output ports in accordance with certain embodiments described herein.
Figure 5A:
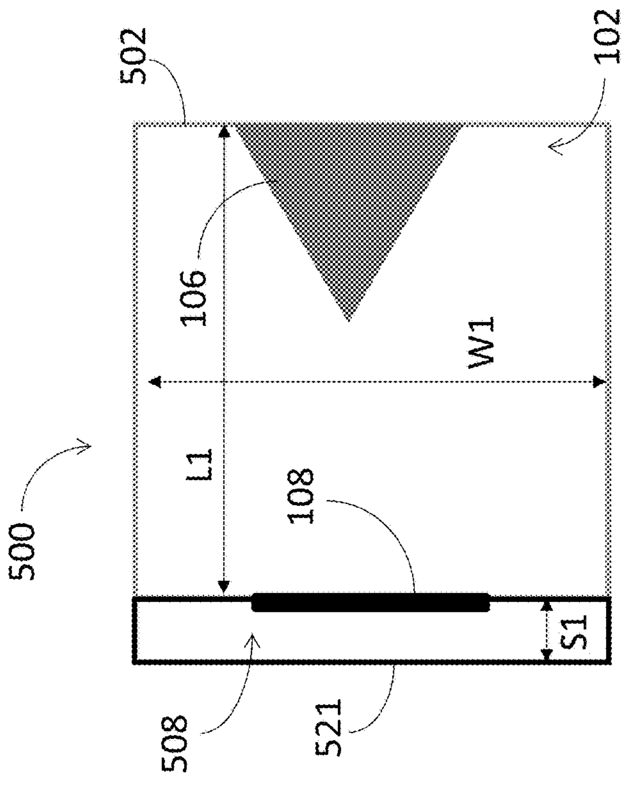
Figure 5C:
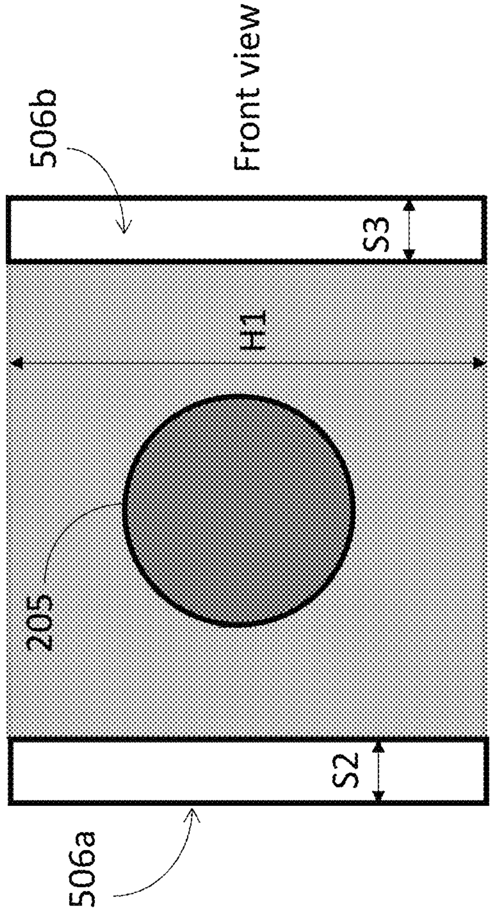
Figure 5D:
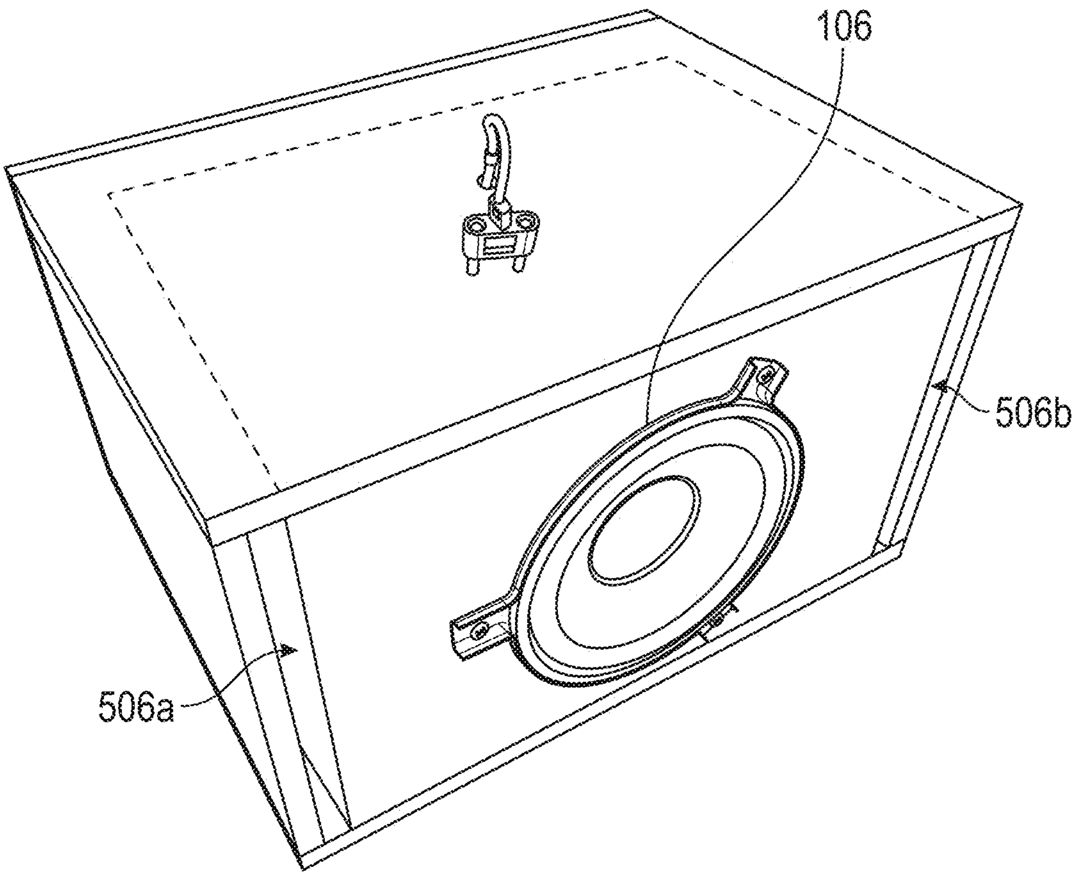

FIG. 4A-4B illustrate side cross-sectional view (A) and front view (B) of another example loudspeaker 400 having an enclosure comprising a primary chamber 102 and a folded secondary chamber 404 that shares a join wall 208 with the primary chamber 102. The enclosure of the loudspeaker 400 may have one or more features similar to the features described above with respect to the loudspeaker 300, however the folded secondary chamber 404 may comprise an internal wall 418 that divides the secondary chamber 404 into a first and a second sub-chamber connected via an opening or channel. Both sub-chambers may have a length L2 and a width W2. The first sub-chamber may share a joint wall 208 with the primary chamber 102 and have a height H2 (a vertical distance between the joint wall 208 and the internal wall 418). The second sub-chamber may be formed between the internal wall 418 and the bottom panel 412 of the secondary chamber 404, and have a height H3 (a vertical distance between the joint wall 208 and the bottom panel 412. In some examples, H2 can be substantially equal to H3. In some other examples, H2 and H3 can have different values. The output port 406 may have an area of H3×W2 through which the secondary output sound waves are radiated out of the loudspeaker 400. The folded secondary chamber 404 may be extended along a folded longitudinal path 430 from the PR 108 (e.g., from the middle of the PR 108) to the output port 406 of the secondary chamber 404. In some examples, an effective length of the secondary chamber 404 comprising the length of the longitudinal optical path 430 can be longer than L2 (close to 2×L2). As such, the folded secondary chamber 404 may provide acoustic properties of a longer secondary chamber without increasing the length of the loudspeaker.

In various embodiments, the L2, W2, H2 and H3 may be tailored based at least in part on values of L1, W1, H1, and characteristics of the speaker driver 106 and PR 108. In some cases, the area (H3×W2) of the output port 306 may be smaller than 38%, 30%, 20%, but larger than 5% of the area or effective area of PR 108.

FIG. 5A-5D illustrate side cross-sectional view (A), top cross-sectional view (B), front view (C), and three dimensional view (D) of an example loudspeaker enclosure comprising a primary chamber 102 and a secondary chamber 504 surrounding the primary chamber 102 and having two output ports **506*a*/506*b*** in accordance with certain embodiments described herein.

The primary chamber comprises a front wall 502, a first pair of side walls 522 and a first back wall 520. The first pair of side walls 522 and the first back wall 520 are joint walls shared between the primary chamber 102 and the secondary chamber 504. The primary chamber 102 has a length along a longitudinal direction perpendicular to the front wall and a width along a lateral direction perpendicular to the longitudinal direction and the first pair of side walls 522. The speaker driver 106 is disposed on the front wall and the passive radiator 108 is disposed on the first back wall 520. The secondary chamber 504 is formed between a second pair of side walls 524, a second back wall 521, and the first pair of side walls 522 and the first back wall 520. Both the primary chamber 102 and the secondary chamber 504 may be bound with a top panel and bottom panel, where the top and the bottom panels are perpendicular to the front wall. The primary chamber 102 and the secondary chamber 504 may have a height along a vertical direction perpendicular to the top and bottom panels.

The second back wall 521 may face the first back wall 520, and each of the side walls of the second pair of sidewalls 524 may face the respective sidewall of the first pair of side walls 522. In some embodiments, the second back wall 521 is substantially parallel to the first back wall 520, and each of the side walls of the second pair of sidewalls 524 are parallel to the respective sidewall of the first pair of side walls 522. In some other embodiments, the second back wall 521 can be tilted relative to the first back wall 520, and each of the side walls of the second pair of sidewalls 524 can be tilted relative to the respective sidewall of the first pair of side walls 522.

The secondary chamber 504 comprises a first output port **506*a* formed between one of the first pair of side walls 522 and the respective side wall of the second pair of side walls 524, and second output port 506*b* formed between the other one of the first pair of side walls 522 and the respective side wall of the second pair of side walls 524. The first output port 506*a* has first output area S2 and the second output port 506*b* has a second output area S3, in a plane parallel to the front wall 502. The first and second output ports 506*a*/506*b* are configured to radiate sound waves received from the PR 108 out of the secondary chamber 504 and away from the loudspeaker 500. In some embodiments, the first output area S2 and/or the second output area S3 can be smaller than 385, 30%, or 20% of the effective area of PR 108 but larger than 5% of the effective area of PR 108**. In some embodiments, the second output area S3 is substantially equal to the first output area S2. In some embodiments, the second output area S3 is different from the first output area S2.

The secondary chamber 504 may have a first cross-sectional area in a plane perpendicular to the first back wall 520, and a third and a second cross-sectional areas in a plane perpendicular to a sidewall of the first pair of side walls 522. The third and the second cross-sectional areas are bound by different walls of the first pair of side walls 522 and the corresponding side walls of the second pair of side walls 524.

In some embodiments, at least one of the first, the second and third cross-sectional areas may not exceed 38%, 30%, or 20% of the effective area of the PR 108, along a longitudinal path 530 extended from first output port **506*a* to the second output port 506*b*. In some embodiments, at least one of the first, the second and the third cross-sectional areas may remain constant along a longitudinal path 530 extended from first output port 506*a* to the second output port 506*b***. In some embodiments the first, the second and the third cross-sectional areas may be substantially equal. In some cases, the first cross sectional area and the second cross-sectional area can be substantially equal to the first output area S2 and the second output area S3 respectively.

In some cases, a cross-sectional area of the secondary chamber 504 in a plane perpendicular to a longitudinal path 530 extending from the first output port **506*a* to the second output port 506*b*, may stay constant or vary at least in a portion of the longitudinal path 530**.

In some cases, the speaker driver 106 may comprise a sub-woofer (e.g., a 6", 8", 10", 12", or 15" sub-woofer).

In some cases, the effective area of a passive radiator can be from 10 square inches to 70 square inches. In some cases, the effective area of a passive radiator can have circular or rectangular shape. In some examples, the length and the width of a rectangular passive radiator can be from 2 inches to 12 inches.

In various implementations, the dimensions of the primary chamber may be determined based on an intended response of the speaker system and other criteria set by a specific application or user in addition to maintaining the cross-section area the secondary chamber (the air plenum) between 5% and 38% of the effective area of the passive radiator that acoustically couples the primary chamber to the secondary chamber. In some examples, the area of the output port of the secondary chamber is substantially equal to the cross-sectional area of the secondary chamber at its output port. In various implementations, cross-section area can be from 5% to 10%, from 10% to 20%, from 20 to 30%, form 30% to 38% of the effective area of the PR 108. Additionally, the volume of the secondary chamber may be minimized to allow for full excursion and operation of the passive radiator. In some cases, the minimum volume of the secondary chamber may be determined based on an air mass required to lower the resonant frequency of the passive radiator to a desired value.

Figure 6:
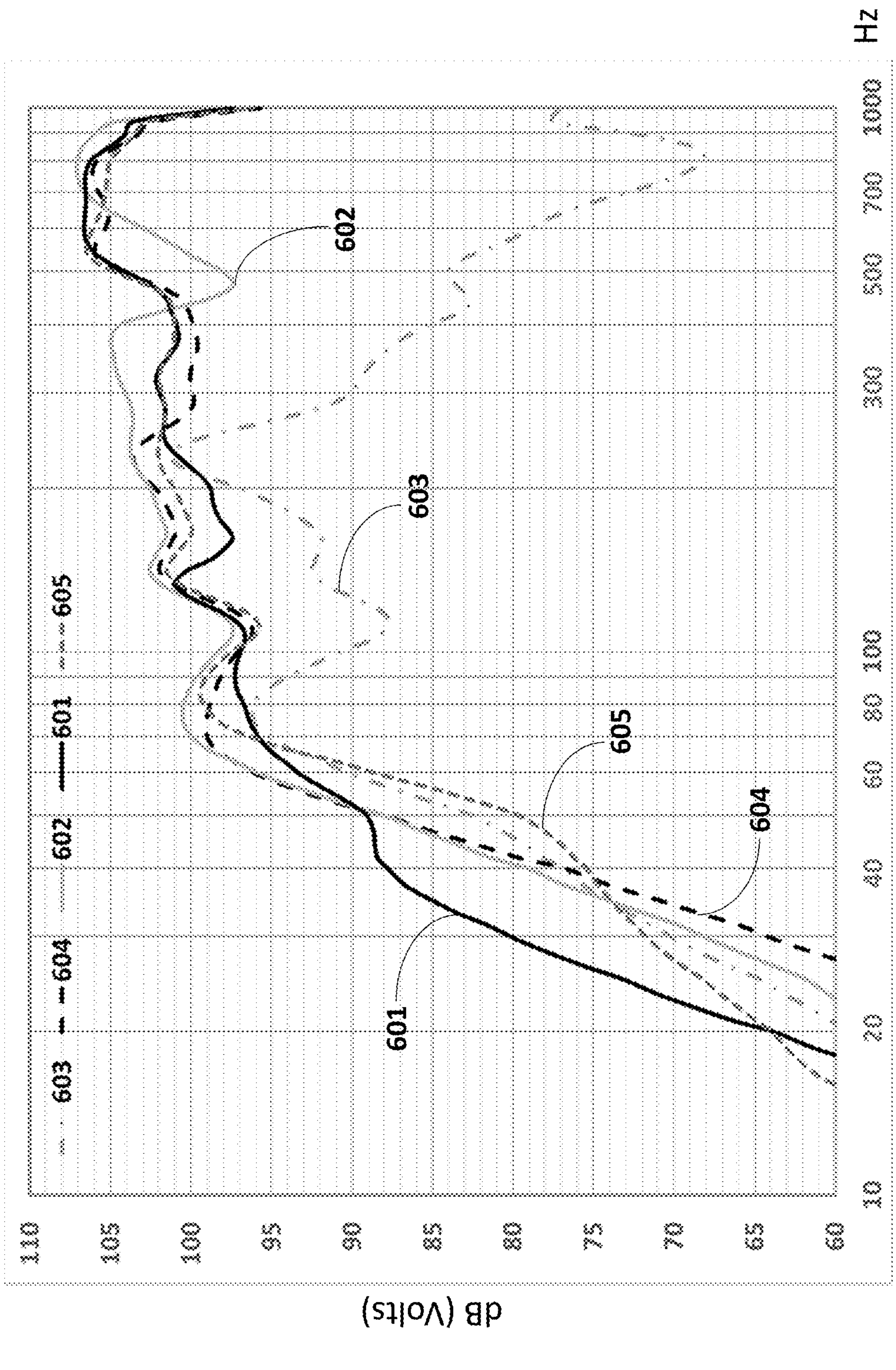
FIG. 6 illustrates output acoustic power spectrum for three conventional loudspeakers, and two loudspeakers having secondary chambers in accordance with certain embodiments described herein.

FIG. 6 illustrates measured output acoustic power spectrums for five loudspeakers having different enclosures in the frequency range between 20 Hz and 1000 Hz. The acoustic output power is measured using a ground-plane measurement configuration at a distance of 1 meter from the speaker driver.

The first curve 601 is the measured output acoustic power spectrum of a loudspeaker similar to the loudspeaker 200 having a 10 inch speaker driver, a length (L1) of 75 cm, and a rectangular output port having an area of 80 $cm^2$ (e.g., 40 mm×200 mm).

The second curve 602 is the measured output acoustic power spectrum of a conventional high efficiency loudspeaker having a vented enclosure (similar to the loudspeaker 103, but without the PR 107) and a 10 inch speaker driver.

The third curve 603 is the measured output acoustic power spectrum of a conventional loudspeaker having a low frequency (LF) speaker driver and a Band Pass enclosure (similar to the loudspeaker 103).

The fourth curve 604 is the measured output acoustic power spectrum of a loudspeaker similar to the loudspeaker 200 having a height (H2) 40 mm, a length L2=L1=356 mm and a rectangular output port having an area of 8 $cm^2$ (e.g., 40 mm×280 mm).

The fifth curve 605 is the measured output acoustic power spectrum of a conventional loudspeaker with passive radiator (similar to the loudspeaker 103)

The measured performances shown in FIG. 6 indicate that adding the secondary chamber can significantly enhance the acoustic output power of a loudspeaker at frequencies below 70 Hz, compared to conventional design without the secondary chamber (air plenum), without affecting the acoustic output power above 70 Hz and below 2000 Hz. Moreover, the enhancement can be tuned at a lower resonant point by increasing the length of the secondary chamber (L2 in loudspeakers 200, 300, and 400).

In various embodiments, L1 and L2 may be determined based at least in part on the dimensions of one or both of the primary chamber and effective area of the passive radiator. In some examples, L1 may be substantially equal to L2. In some such examples, the performance of the loud speaker may be improved compared to cases where L1 and L2 are not equal. In some examples, the dimensions of the secondary chamber (e.g., W1, W2 and H2) may be selected so as to make the area of the output port of the secondary chamber less than 30% but greater than 5%, 10%, or 15% of the effective area of the passive radiator.

Figure 7:
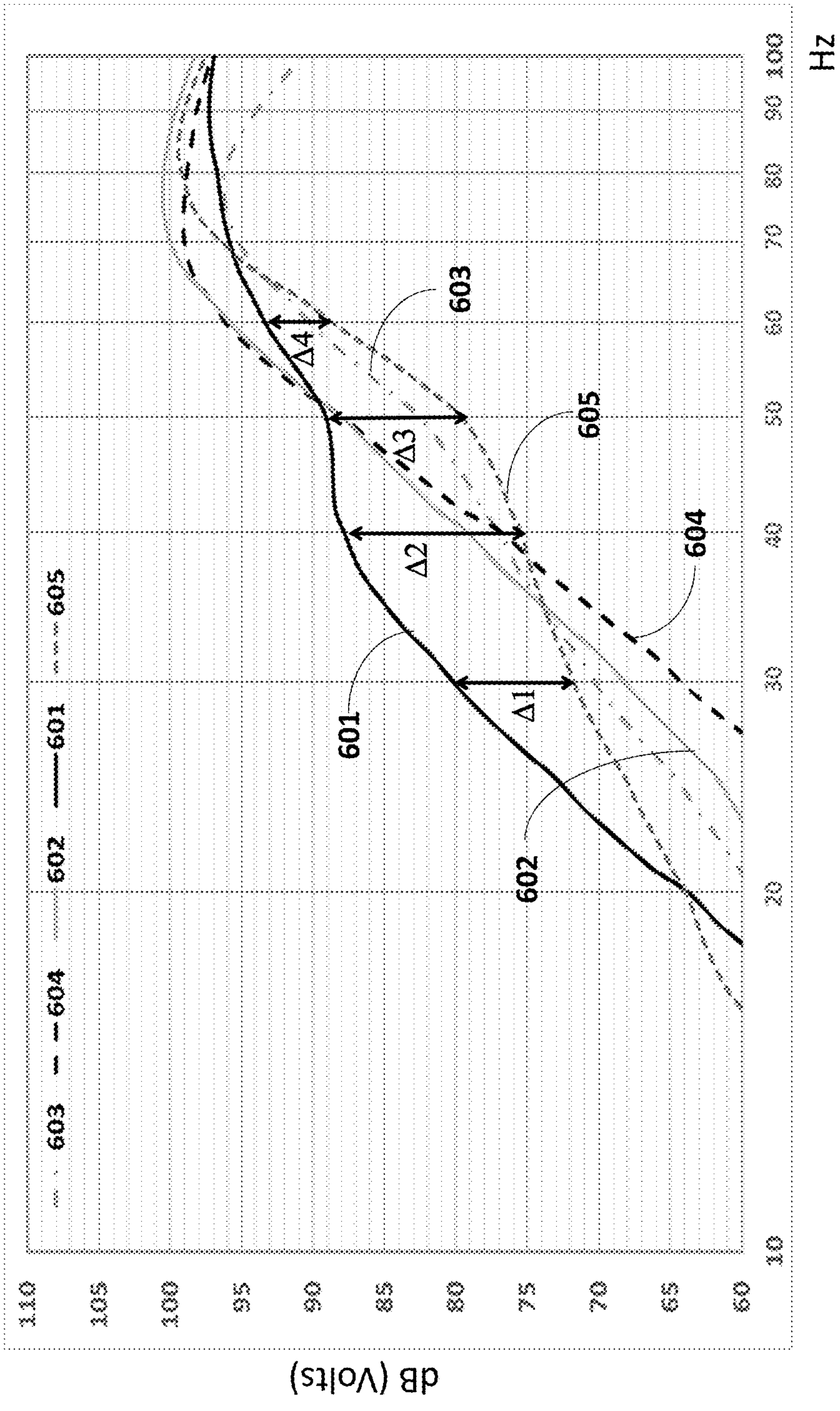
FIG. 7 illustrates the output acoustic power spectrums shown in FIG. 6 plotted between 10 and 100 Hz.

FIG. 7 illustrates measured output acoustic power spectrums shown in FIG. 6 plotted between 10 Hz and 100 Hz to illustrate their differences more clearly. The double sided arrows in FIG. 7 indicate the gain that the loudspeaker associated with the power spectrum 601, which includes a secondary chamber similar to the loudspeaker 300, provides over the conventional loudspeaker design associated with the power spectrum 605, at 30 Hz (Δ1), 40 Hz (Δ2), 50 Hz (Δ3), 60 HZ (Δ4). The measured performances shown in FIG. 7 indicate that adding the air plenum has increased the acoustic output power compared to conventional design without the secondary chamber (air plenum), by at least 8 dB, 13 dB, 9.5 dB, and 4 dB, at 30 Hz, 40 Hz, 50 Hz, and 60 Hz, respectively.

Figure 8:
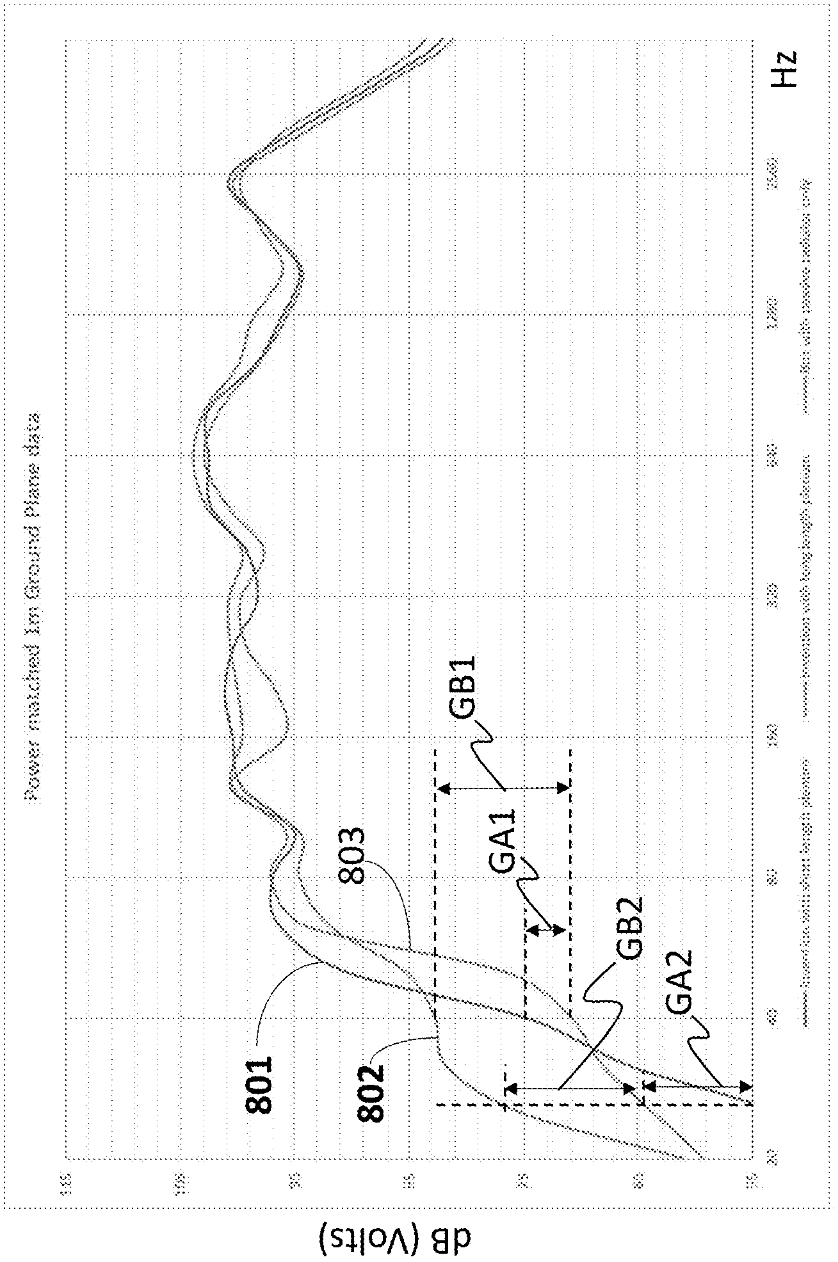
FIG. 8 illustrates output acoustic power spectrums for a conventional loudspeaker, and two loudspeakers having secondary chambers in accordance with certain embodiments described herein.

FIG. 8 illustrates the measured output acoustic power spectrums for two loudspeakers (curves 801 and 802) similar to the loud speaker 100 having identical primary chambers and PRs but different secondary chambers, and a conventional loudspeaker (curve 803) similar to the loudspeaker 103 without a secondary chamber in the frequency range between 20 Hz and 5120 Hz.

The first power spectrum 801 (green) is the measured output acoustic power spectrum of a first loudspeaker design similar to the loudspeaker 200, with L1=L2, H2=40 mm, W1=W2=28 mm.

The second power spectrum 802 (brown) is the measured output acoustic power spectrum of a second loudspeaker design similar to the loudspeaker 400, with L2=75 cm>L1, H2=40 mm, and W2=200 mm. The PR used in the second loudspeaker design is identical to that of the first loudspeaker design.

The third power spectrum 803 is the measured output acoustic power spectrum of a conventional high efficiency loudspeaker having a passive radiator identical to those of the first loudspeaker and the second loudspeaker designs associated with the power spectrums 801 and 802.

The measured performances shown in FIG. 8 indicate that adding the secondary chamber improves at least a portion of the low frequency performance with respect to a conventional loudspeaker, and increasing the length of the air plenum length generally improves the low frequency output. For example, the first loud speaker design, improves the output acoustic power at 40 Hz compared to conventional design by 4 dB (GA1), but reduces the output acoustic power at 27 Hz compared to conventional design by about 10 dB (GA2). The second loudspeaker design (that has a longer secondary chamber compared to the first design), improves the output acoustic power compared to conventional design by 12 dB at 40 Hz (GB1), and at 27 Hz (GB2).

Figure 9:
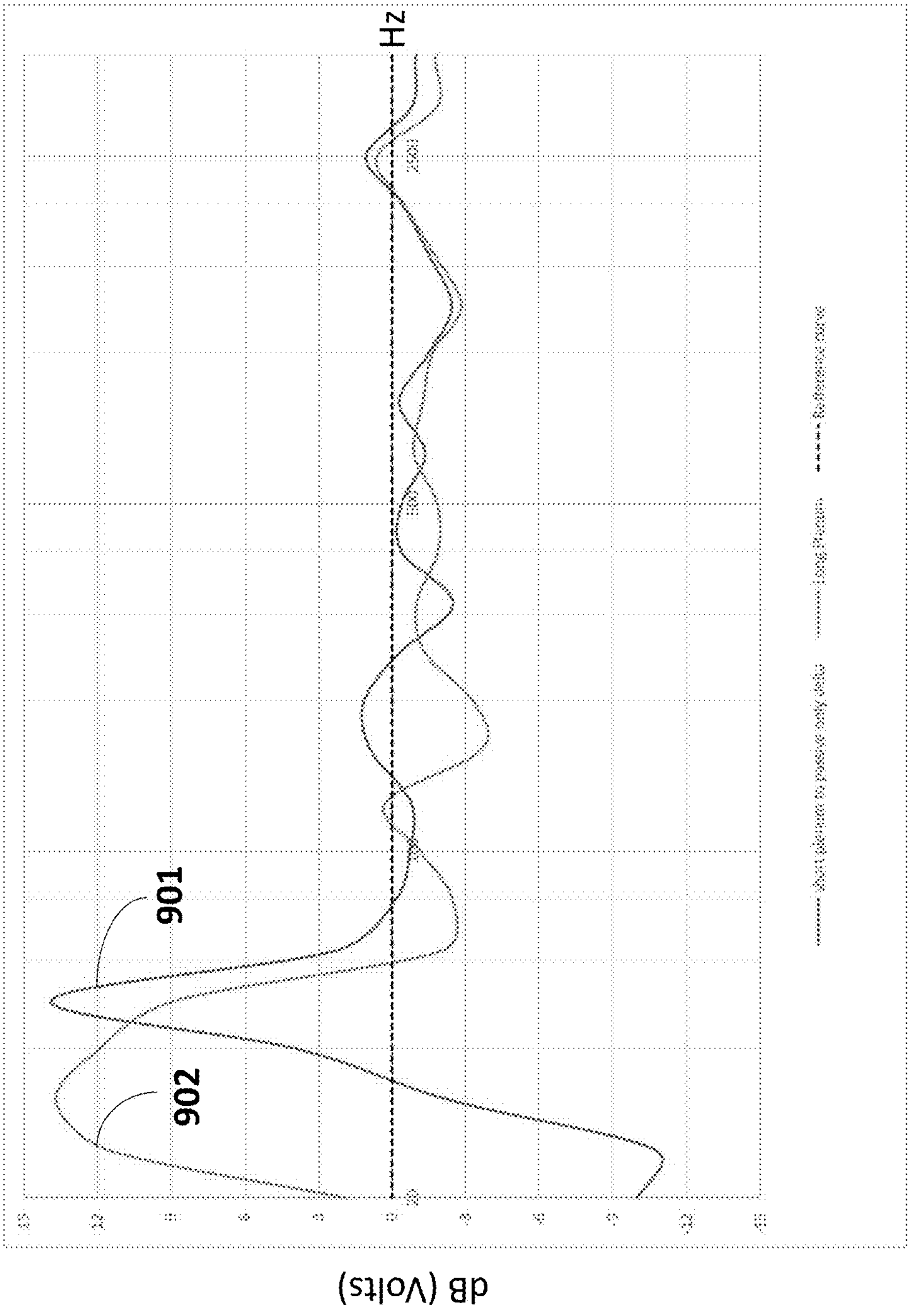
FIG. 9 illustrates spectrum of the relative output power of the two loudspeakers having secondary chambers with respect to that of the conventional loudspeaker, shown in FIG. 8.

FIG. 9 illustrates spectrum of the relative improvement of the output acoustic power of the first and the second loudspeaker designs associated with the power spectrums 801 and 802, with respect to the conventional design associated with the power spectrum 803, in FIG. 8, plotted from 20 Hz to 2500 Hz. The first curve 901 is the difference (in dB) between curves (power spectrums) 801 and 803 in FIG. 8. The second curve 902 is the difference (in dB) between curves (power spectrums) 802 and 803 in FIG. 8. These comparisons further show that a longer air plenum (secondary chamber) boosts the low frequency performance of the loudspeaker in a wider frequency range.

Figure 10:
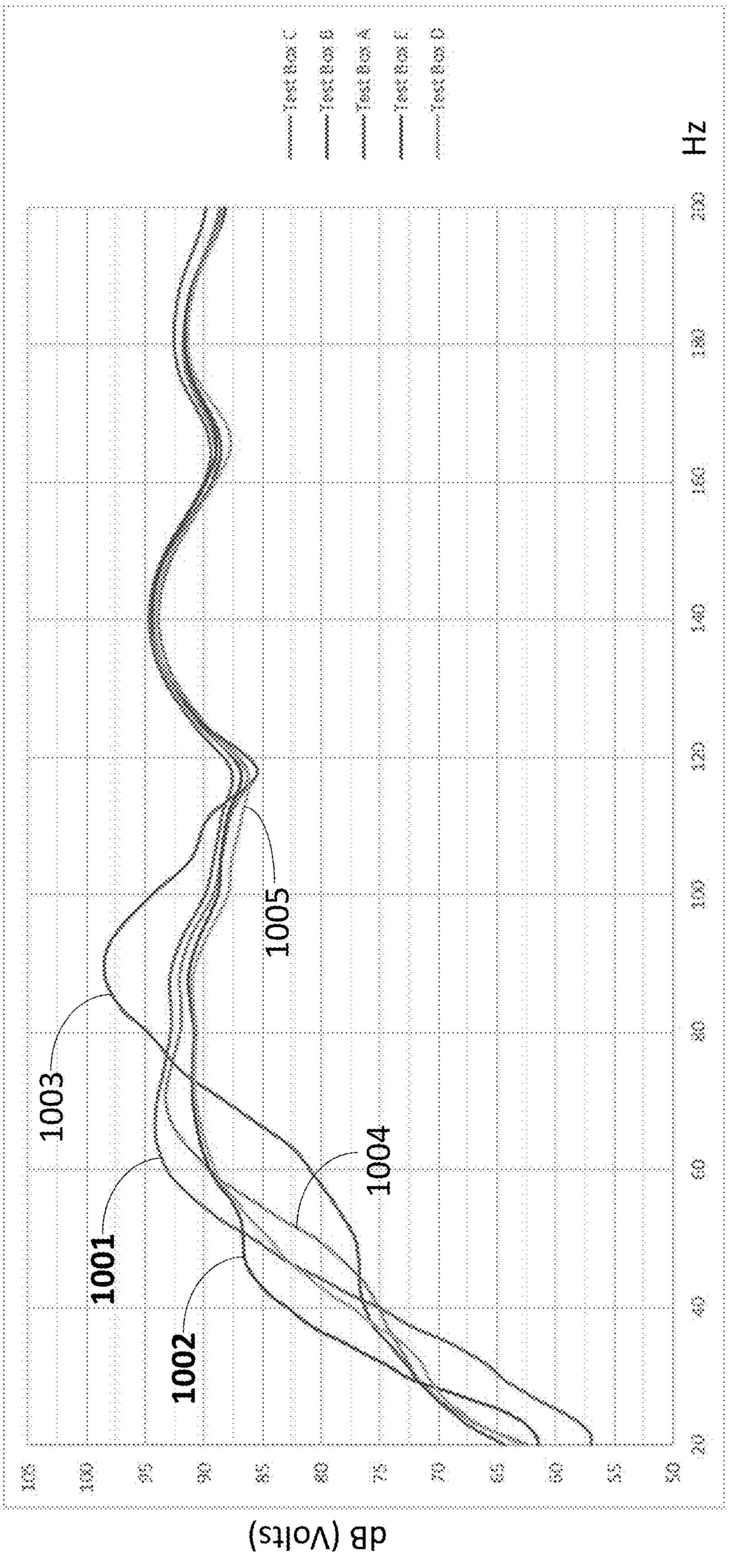
FIG. 10 illustrates output acoustic power spectrums for three conventional loudspeakers, and two loudspeakers having secondary chambers in accordance with certain embodiments described herein. The power spectrums are measured at ground plane.

FIG. 10 illustrates the output acoustic power spectrum for five loudspeakers having different enclosures some of which include added mass on the passive radiator, all measured at ground plane 1 meter away from the corresponding loudspeaker along a line perpendicular to front wall of the enclosure on which the speaker driver is mounted.

The first curve (power spectrum) 1001 is the measured output acoustic power spectrum of a loudspeaker similar to the loudspeaker 500 shown in FIG. 5 with L1=25.4 cm, W1=33.0 cm, H1=17.8 cm, S1=12 mm, S2=12 mm, S3=12 mm. The speaker driver is a 6-inch sub-woofer, and the PR 108 having an effective area of 219 $cm^2$. The length air plenum (the secondary chamber) along the longitudinal direction extended from the first output port 506*a* to the second output port 506*b* is about 80 cm (40 cm from the center of the PR 108 to each of the output ports).

The second curve 1002 is the measured output acoustic power spectrum of the loudspeaker associated with first curve 100, with one of the output ports closed.

The third curve 1003 is the measured output acoustic power spectrum of a loudspeaker similar to the loudspeaker associated with curve 1001, without the back wall 521, effectively representing the performance of a conventional loudspeaker similar to the loudspeaker 103.

The fourth curve 1004 is the measured output acoustic power spectrum of a loudspeaker similar to the loudspeaker 103 (e.g., a conventional loudspeaker with passive radiator), where the primary chamber 101, the speaker driver 105, and the passive driver 107 are identical to those of the loudspeaker associated with the curve 1001 (without the secondary chamber), and with a mass of 27 g added to the passive radiator.

The fifth curve 1005 is the measured output acoustic power spectrum of a loudspeaker similar to the loudspeaker associated with curve 1004, where the added mass of to the passive radiator is 54 g.

FIG. 10 shows that the effect of the adding mass to the passive radiator in the absence of the secondary chamber (and the corresponding plenum air mass), in a conventional loudspeaker, is similar to adding the secondary chamber where the mass of air in the secondary chamber loads the passive radiator. The plenum air mass effectively adjusts the resonant frequency of the passive radiator to a lower values. Adding mass to a passive radiator also lowers the resonant frequency of the passive radiator however it also creates more acoustic loss compared to air plenum. For example, at 40 Hz the output power for curve 1001 (loudspeaker with secondary chamber) is more than 5 dB larger than that of the curves 1004 and 1005 (loudspeakers without secondary chamber and 2 grams and 54 grams added to their passive radiator).

In some cases, when the secondary chamber 104 is eliminated from a loudspeaker 100 without changing any other device or parameter of the loudspeaker 100, the acoustic output power of the loudspeaker may drop by 5 dB in a low frequency between 20 and 60 Hz which is dependent to the overall enclosure size and transducers chosen.

Figure 11:
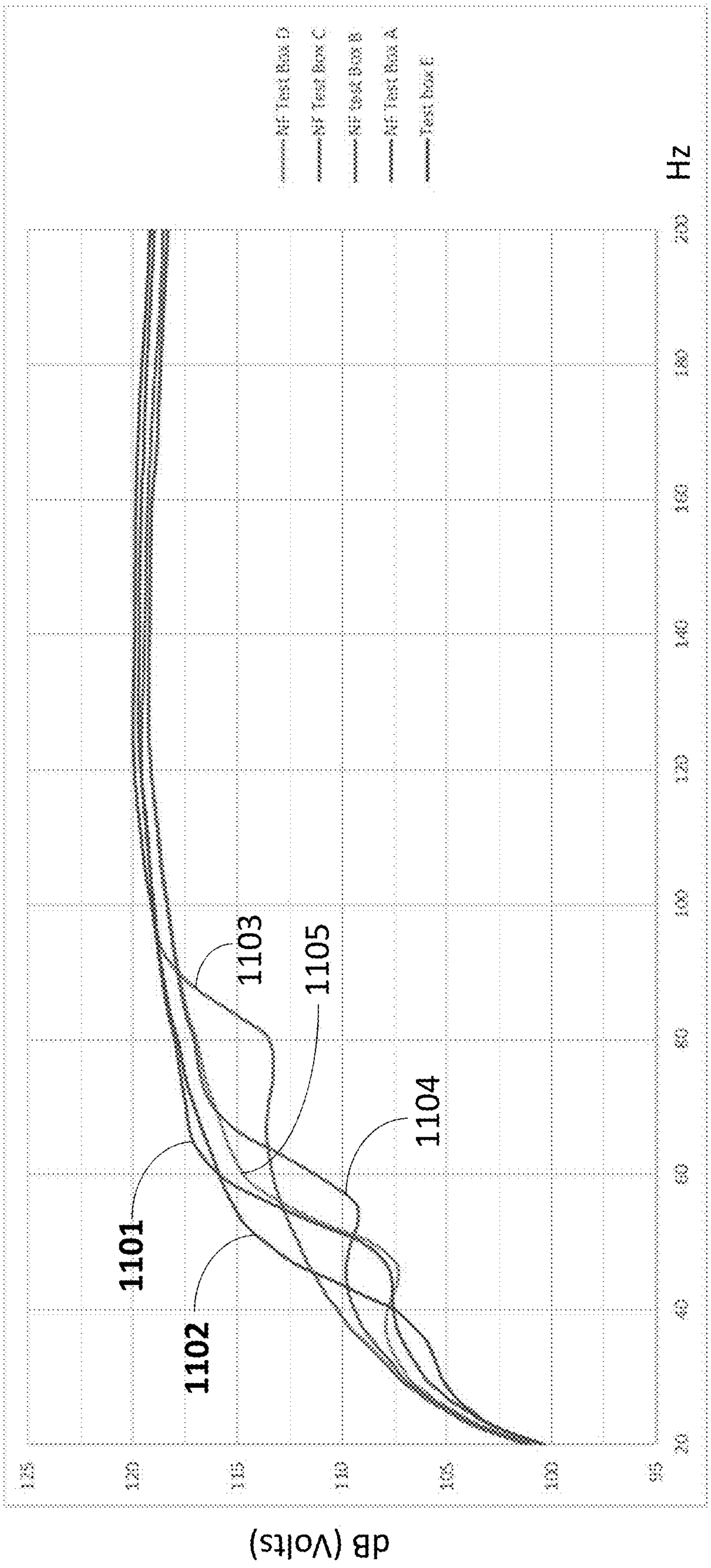
FIG. 11 illustrates output acoustic power spectrum for the loudspeakers of FIG. 10, measured at near filed.

FIG. 11 illustrate output acoustic power spectrum for the five loudspeakers used for generating the curves in FIG. 10, measured at a near filed region. This near field measurement clearly show the behavior of the resonant frequency (tuning) of the passive radiator in the presence of air plenum and added mass. When no mass is added to the PR and the air plenum is absent, curve 1103, the resonant frequency of the PR is about 78 Hz. When a mass of 27 grams is added to the PR, curve 1104, its resonant frequency drops to around 55 Hz, and when the added mass in increased to 54 grams, curve 1105, its resonant frequency drops to 44 Hz. A comparison between curve 1105 and 1101 (loudspeaker with a secondary chamber and both output ports open), shows that tuning of the resonant frequency of the PR by adding mass of 54 grams is similar to the tuning of the resonant frequency PR (e.g., PR 108 of loudspeaker 500), by adding the air plenum (secondary chamber). Curve 1102 (loudspeaker with a secondary chamber and only one output port open), shows, closing one of the output ports further reduces the resonant frequency of the PR below 40 Hz, indicating that the added air stiffness in the secondary chamber increases the loading effect of the air plenum on the PR.

These results show that one advantage of adding the air plenum is that it allows lowering the tuning of the PR without affecting the acoustic power radiation efficiency at the higher frequencies (e.g., above 50 Hz).

In some implementations, a loudspeaker enclosure may comprise one primary chamber and two or more secondary chambers acoustically coupled to the primary chamber via one or more PRs. In some cases, each secondary chamber may be coupled to the primary chamber via a different PR. For example, the primary chamber may share a joint wall with both secondary chambers, or two separate joint walls each with one secondary chamber. The join wall or walls may comprise two or more PRs acoustically coupling the primary chamber to each of the secondary chambers.

The output area of the output port of each secondary chamber may be smaller than 38% or 30% of the effective area a PR that acoustically couples that secondary chamber to the primary chamber.

In some embodiments, a secondary chamber that is acoustically coupled to a primary chamber via multiple PRs may comprise multiple output ports. In these cases, the output area of each of the output ports may be smaller than 38%, 30%, or 20% of the sum of the effective areas all the PRs acoustically coupling the secondary chamber to the primary chamber. For example, when two passive radiator couple a primary chamber to a secondary chamber, the cross-sectional area of the secondary chamber over each passive radiator should stay below the 30% of each PR. Additionally, the output port of the secondary chamber that outputs the acoustic waves received from both PRs may be have an area smaller than the 30% of the sum of the effective areas of the PRs. In some cases, each output port of a secondary chamber, which is coupled to the primary chamber via multiple PRs, may be closer to one of the PRs.

In some embodiments, a primary chamber may be acoustically coupled to two or more separate secondary chambers (e.g., separated by at least one wall), via two or more PRs. In some such examples, each secondary chamber may be coupled to the primary chamber via one or more PRs different from the PRs that couple the other secondary chambers to the primary chamber. In some such embodiments each secondary chamber may comprise an output port having an output area smaller than, 30% of the sum of the effective areas all the PRs acoustically coupling that secondary chamber to the primary chamber.

In some cases, each output port of a secondary chamber that is coupled to the primary chamber via multiple PRs, may be closer to one of the PRs.

In various implementations, a primary chamber of a loudspeaker may comprise two or more speaker driver. In some cases, at least two speaker drivers of the one or more speaker drivers can be substantially identical speaker drivers.

In various implementations, two or more PRs of multiple PRs that acoustically couple a primary chamber to one or more secondary chambers can be substantially identical.

In some embodiments, a secondary chamber of a loudspeaker enclosure may comprised a tapered or flared chamber having a cross-section area that varies along a longitudinal path (or direction) along the chamber. The longitudinal path may comprise a path from a wall of a secondary chamber to an output port of the secondary chamber, or a path from a PR (that acoustically couples the secondary chamber to the primary chamber) to an output port of the secondary chamber. The cross-sectional area can be the area in a plane perpendicular to the longitudinal path. In some cases, the cross-sectional area may monotonically increase at least along a portion of the longitudinal path. The variation of the cross-sectional area with respect to a distance along the longitudinal path can be linear or non-linear. In some examples, at any point along the longitudinal path the cross-sectional area of a tapered or flared secondary chamber may be larger than 5% but smaller than 38%, 30%, or 20% of the effective area of a PR that acoustically couples the secondary chamber to the primary chamber. In some examples, at any point along the longitudinal path the cross-sectional area of a tapered or flared secondary chamber may be larger than 5% but smaller than 38%, 30%, or 20% of the sum of the effective areas of the PRs that acoustically couple the secondary chamber to the primary chamber.

Figure 12B:
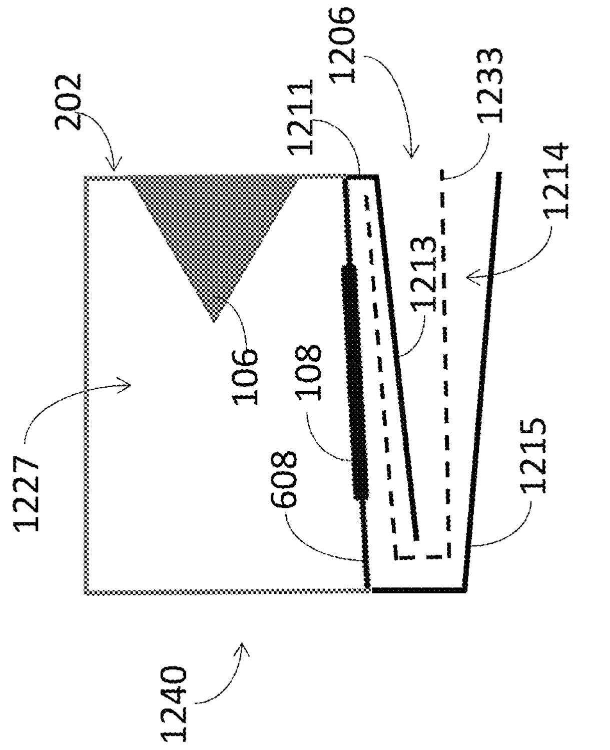
FIG. 12A-12B illustrate side cross-sectional views of two example loudspeaker enclosures comprising a primary chamber and a tapered secondary chamber (A) or a tapered folded secondary chamber (B), in accordance with certain embodiments described herein.
Figure 12A:
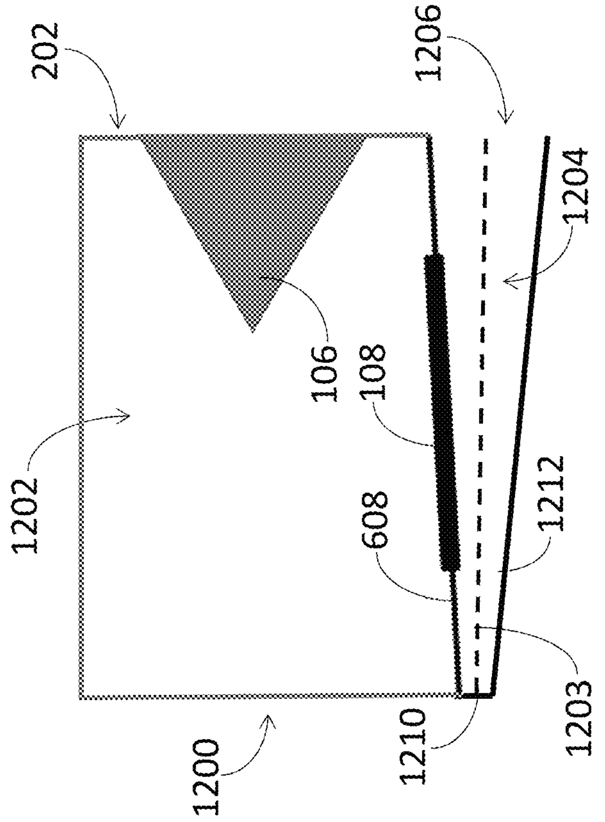

FIG. 12A-12B illustrate side cross-sectional views of two example loudspeaker enclosures comprising a primary chamber and a tapered secondary chamber (A) or a tapered folded secondary chamber (B). The loud speaker 1200 shown in FIG. 12A may comprise one or more features discussed above with respect to the loudspeaker 100 or 200. The loudspeaker 1200 may comprise a primary chamber 1202, having a front panel 202 on which the speaker driver 106 is disposed, a joint wall 608 shared with a secondary chamber 1204. At least one PR 108 may be disposed on the joint wall 608 to acoustically couple the primary chamber 1202 with the secondary chamber 1204. In some embodiments, the secondary chamber 1204 may be a flared chamber having a cross-sectional area that increases along a longitudinal path 1203 extending from a back wall 1201 of the secondary chamber 1204 to an output port 1206 of the secondary chamber 1204. In some such embodiments, at least one of the joint wall and a bottom panel may be sloped or tilted with respect to the longitudinal path. In the example shown in FIG. 12A, both the joint wall 608 and the bottom panel 1212 are tilted with respect to the longitudinal path 1203. In some cases, the joint wall 608 and the bottom panel 1212 may be tilted symmetrically with respect to the longitudinal path 1203.

The loud speaker 1240 shown in FIG. 12B may comprise one or more features discussed above with respect to the loudspeaker 100, 400, or 1200. The loudspeaker 1240 may comprise a primary chamber 1227, having a front panel 202 on which the speaker driver 106 is disposed, a joint wall 608 shared with a secondary chamber 1204. At least one passive radiator (PR 108) may be disposed on the joint wall 608 to acoustically couple the primary chamber 1202 with the secondary chamber 1214. In some embodiments, the secondary chamber 1214 may be a flared folded chamber having a cross-sectional area that increases along a longitudinal path 1233 extending from a front wall 1211 of the secondary chamber 1214 to an output port 1206 of the secondary chamber 1214. The secondary chamber may include at least one interval 1213 that partially divides the secondary chamber 1214 into two connected tapered channels. In some such embodiments, at least one of the joint wall, internal wall, or bottom panel 1215 may be sloped or tilted with respect to each other. In the example shown in FIG. 12B, the joint wall 608, the internal wall 1213, and the bottom panel 1215 are tilted.

Figure 12C:
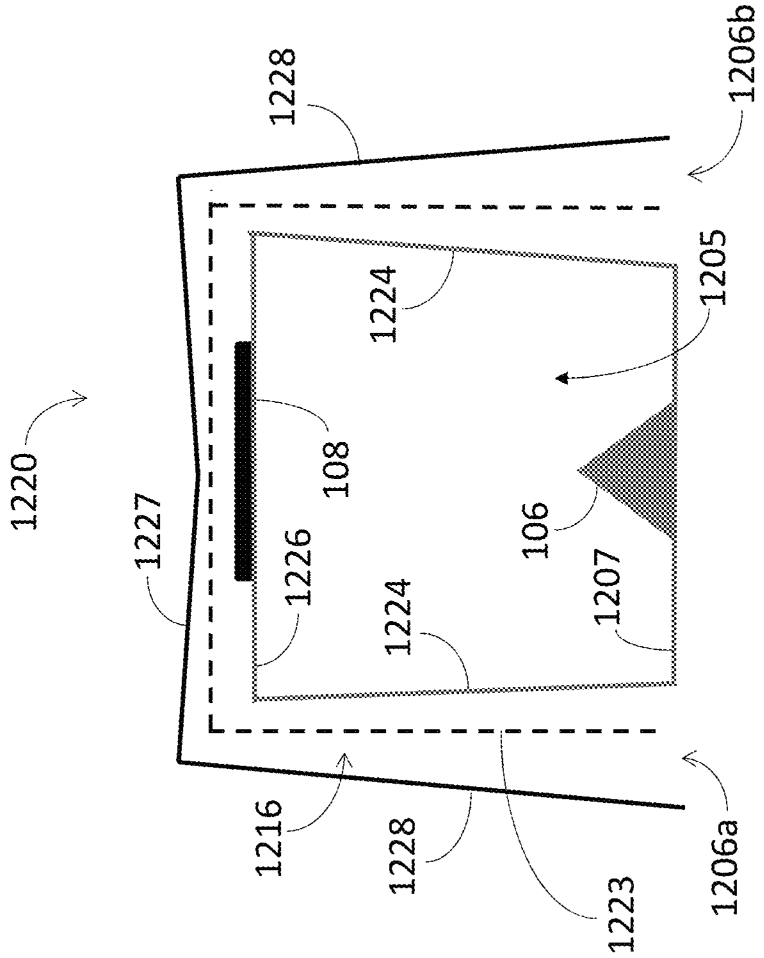
FIG. 12C illustrates top cross-sectional view of an example loudspeaker enclosure comprising a primary chamber and a tapered secondary chamber surrounding the primary chamber, in accordance with certain embodiments described herein.

FIG. 12C illustrates top cross-sectional view of an example loudspeaker enclosure 1220 comprising a primary chamber 1205, a tapered secondary chamber 1216 surrounding the primary chamber 1205, and two output ports 1206*a*/1206*b*. The loud speaker 1220 may comprise one or more features discussed above with respect to the loudspeaker 100, 500, or 1200.

The primary chamber 1205 comprises a front wall 1207, a first pair of side walls 1224, and a first back wall 1226. The first pair of side walls 1224 and the first back wall 1226 are joint walls shared between the primary chamber 1205 and the secondary chamber 1206. The speaker driver 106 is disposed on the front wall 1207 and the passive radiator (PR) 108 is disposed on the first back wall 1226. In some cases, two PRs may be disposed on the first back wall 1226. The secondary chamber 1216 is formed between a second pair of side walls 1228, a second back wall 1227, first pair of side walls 1224, and the first back wall 1226. Both the primary chamber 1202 and the secondary chamber 1216 may be bound with a top panel and bottom panel. The top and the bottom panels can be perpendicular to the front wall 1207.

The second back wall 1227 may face the first back wall 1226, and each of the side walls of the second pair of sidewalls 1228 may face the respective sidewall of the first pair of side walls 1224. The secondary chamber 1216 comprises a first output port 1206*a* formed between one of the first pair of side walls 1224 and the respective side wall of the second pair of side walls 1228, and second output port 1206*b* formed between the other one of the first pair of side walls 1224 and the respective side wall of the second pair of side walls 1228. The first output port 1206*a* has a first output area and the second output port 506*b* has a second output area. In some embodiments (such as the embodiment shown in FIG. 12C), the secondary chamber 1216 maybe a tapered chamber having a cross-sectional area that increases along a longitudinal path 1223 extending from the middle of the PR 108 to the first output port 1206*a* and the second output port 1206*b*. At least one of the, the first or second back walls 1226, 1227, the first pair of sidewalls 1224, or the second pair of sidewalls 1228 may be tilted with respect to each other to forma tapered or at least partially tapered secondary chamber.

In various implementations, the areas of the output ports 1206, 1206*a*, and 1206*b*, and the cross-sectional areas of the secondary chambers 1204, 1214, and 1216 may not exceed 38%, 30%, or 20% of the effective area of the PR 108 but may be larger than 5% of the effective area of the PR 108. The cross-sectional areas of the secondary chambers 1204, 1214, or 1216, may comprise cross-sectional areas in planes perpendicular to the longitudinal paths 1212, 1233, 1223 at any point along these longitudinal paths.

Figure 13A:
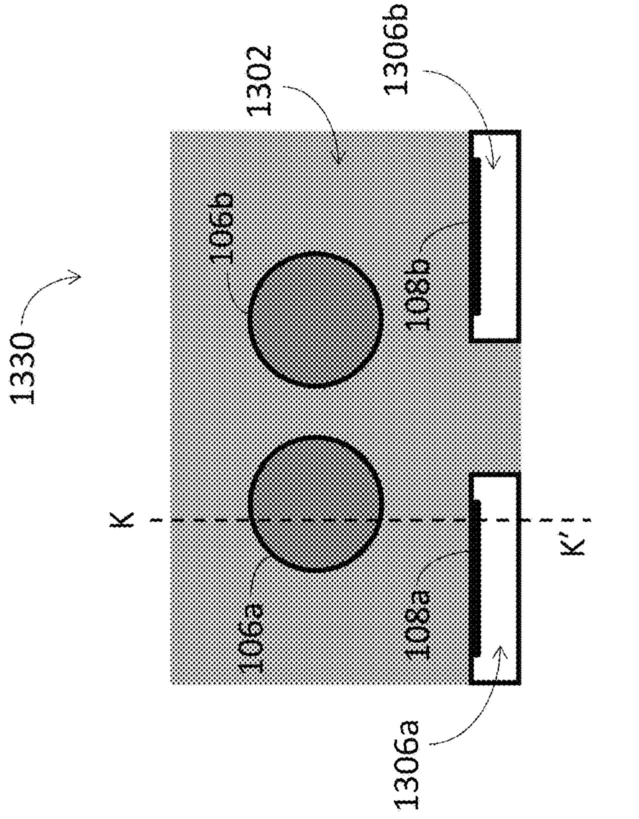
FIG. 13A-13C illustrate front view (A), side view (B), and top view (C) of an example loudspeaker enclosure comprising a primary chamber and two secondary chambers acoustically coupled to the primary chamber via two passive radiators, in accordance with certain embodiments described herein.
Figure 13B:
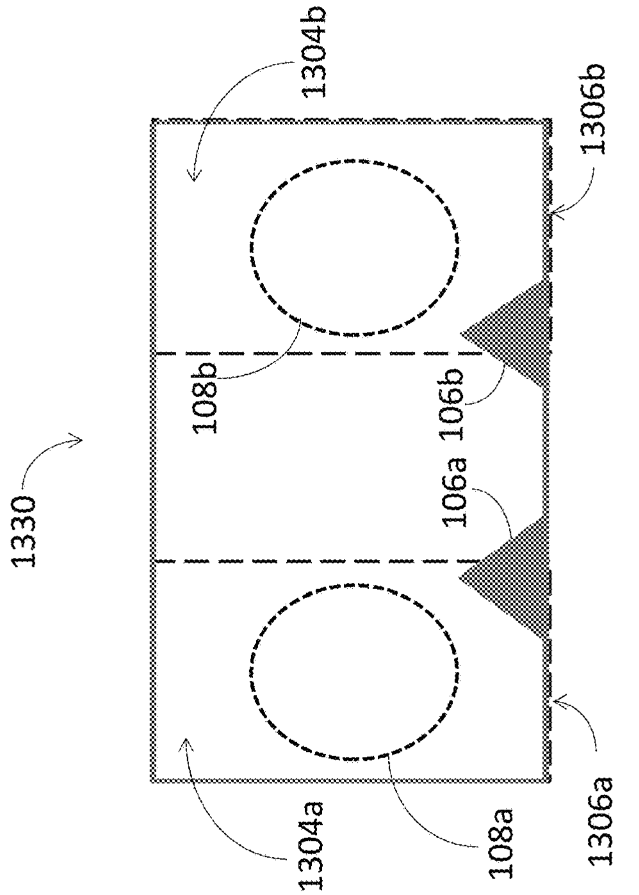
Figure 13D:
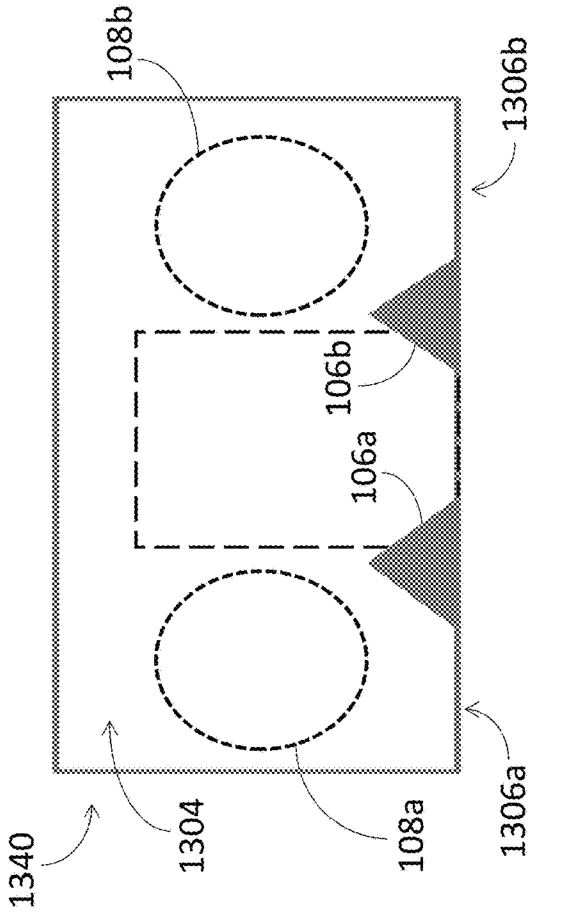
FIG. 13D illustrates top view of an example loudspeaker enclosure comprising a primary chamber and a secondary chamber acoustically coupled to the primary chamber via two passive radiators, in accordance with certain embodiments described herein.
Figure 13C:
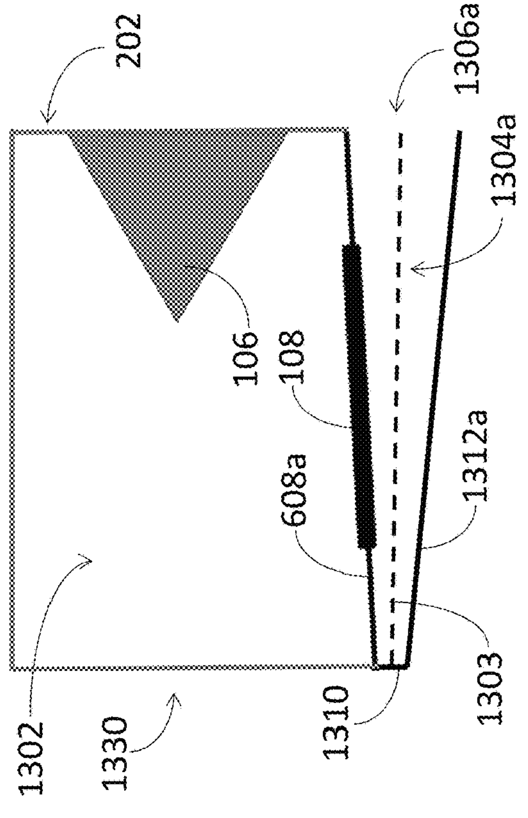

FIG. 13A-13C illustrate front view (A), top cross-sectional view (B), and side cross-sectional view (C) of an example loudspeaker 1330 comprising a primary chamber 1302 and two secondary chambers 1304*a* and 1304*b* acoustically coupled to the primary chamber 1302 via two passive radiators 108*a*, 108*b*. In some embodiments, the loudspeaker 1330 may comprise two speaker drivers 106*a*, 106*b* mounted on a front panel 202 of the loudspeaker 1330 and two output ports 1306*a*, 1306*b* each associated with one of the two secondary chambers 1304*a* and 1304*b*. In some examples, the secondary chambers 1304*a* and 1304*b* may be positioned underneath the primary chamber 1302. In some embodiments, the primary chamber 1302 may comprise a joint wall shared with the secondary chambers, on which the passive radiators 108*a*, 108*b* are disposed. In some cases, the joint wall may comprise a first joint wall shared with the first secondary chamber 1304*a*, on which a first passive radiator 108*a* is disposed, and comprise a second joint wall shared with the second secondary chamber and 1304*b*, on which a second passive radiator 108*b* is disposed. In some cases, the first and the second joint walls may be separate walls of the primary chamber 1302. In some cases, the first and the second joint walls may be regions of a single joint wall of the primary chamber 1302. In some cases, the loudspeaker 1330 may comprise one or more features described above with respect to the loudspeaker 1200 or the loudspeaker 1240.

FIG. 13B, illustrates a top cross-sectional view of the loudspeaker 1330 illustrating the configuration and the positions of the two secondary chambers 1304*a*, 1304*b* positioned underneath the primary chamber 1302, and the corresponding output ports 1306*a*, 1306*b* and PRs 108*a*, 108*b*.

In some cases, at least one of the first and the second secondary chambers 1304*a* and 1304*b* may comprise a tapered chamber. FIG. 13C, illustrates a side cross-sectional view of the loudspeaker 1330 having at least one tapered secondary chamber. As shown, the cross-sectional area of the first secondary chamber 1304*a* increases along a longitudinal path 1303 extending from a back wall 1310 of the secondary chamber 1304*a* to the output port 1306*a* of the secondary chamber 1034*a*. In the example shown, the first joint wall 608*a* and a first bottom panel 1312*a* can be tilted with respect to the longitudinal path 1303 to form the tapered secondary chamber 1304*a*.

FIG. 13D illustrates top cross-sectional view of another example loudspeaker 1340 having a single secondary chamber 1304 acoustically coupled to a primary chamber 1304 via two PRs 180*a*, 108*b* and a first output port 1306*a* closer to a first R 108*a* and a second output port 108*b* closer to a second PR. The loudspeaker 1340 may comprise one or more features descried with respect to the loudspeaker 1330. In some embodiments, the secondary chamber 1304 may comprise two compartments connect via channel.

The area of each of the output ports 1306*a*, 1306*b*, of the loudspeakers 1330 and 1340, and the vertical cross-sectional areas of the secondary chambers 1304, 1304*a* and 1304*b*, may not exceed 38%, 30%, or 20% of the sum of the effective areas of the PR 108*a* and the PR 108*b* of the corresponding loudspeakers, but may be larger than 5% of the sum of the effective areas of the PR 108*a* and PR 108*b* of the corresponding loudspeaker.

The loudspeakers 200, 300, 400, 500, 1200, 1220, 1240, 1330, and 1340 may comprise one or more features described above with respect to the loudspeaker 100.

Figure 14:
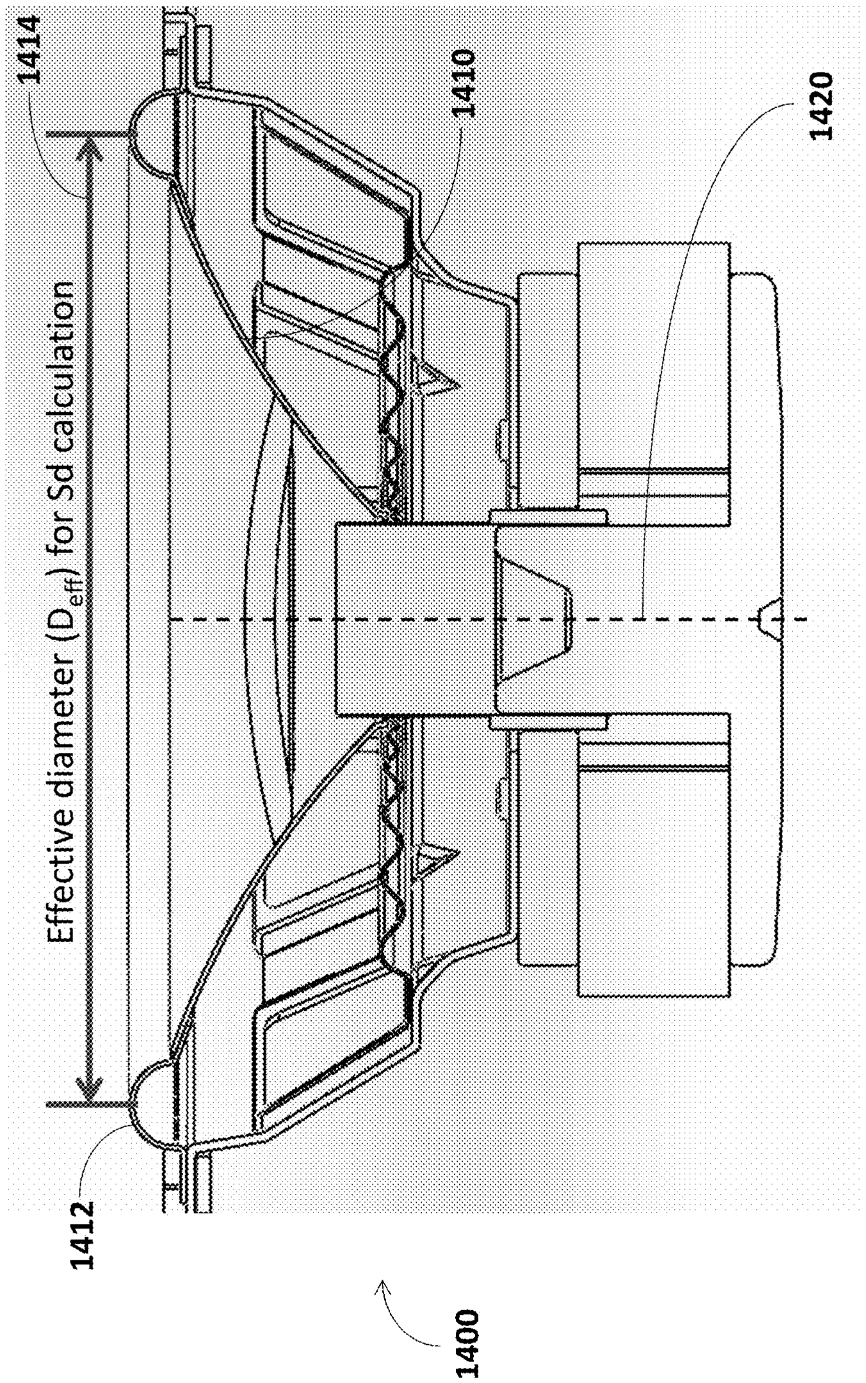
FIG. 14 illustrates a side cross-sectional view of a passive radiation in a plane to parallel to its rotational axis.

As described above, the effective area of a passive radiator (PR) may be determined based on a standard $S_d$ rating of the passive radiator. In some examples, the standard $S_d$ rating may comprise an area calculated using an effective diameter ($D_{eff}$) of a projected area the PR cone. In some cases, $S_d$ can be equal to $(\pi/4)\times(D_{eff})^2$. In some examples, $D_{eff}$ can be the diameter of the PR cone at an output plane of the PR including half of the roll (or the surround) connecting the cone to the PR frame. FIG. 14 illustrates a side cross-sectional view of a PR 1400 in a plane to parallel to the rotational axis 1420 of the PR 1400. In this example, the cone 1410 is a cylindrically symmetric cone having an axis of symmetry 1420, and $D_{eff}$ 1414 is the diameter of a circle formed in plane perpendicular to the rotational axis 1420 and tangent to the top surface of the roll 1412.

EXAMPLE EMBODIMENTS

Some additional nonlimiting examples of embodiments discussed above are provided below. These should not be read as limiting the breadth of the disclosure in any way.

Example 1. A loudspeaker configured to generate sound waves, the loudspeaker comprising:

a primary chamber comprising at least one speaker driver that generates sound waves, radiates a first potion of sound waves away from the primary chamber, and radiates a second portion of the sound waves into the primary chamber, wherein the first portion of sound waves comprises fundamental output sound waves;

at least one passive radiator having an effective area configured to radiate intermediate sound waves associated with the second portion of the sound waves; and at least one secondary chamber acoustically coupled to the primary chamber via the at least one passive radiator, the secondary chamber comprising at least one output port having an output area, at least one output port configured to allow radiation of intermediate sound waves received from the passive radiator out of the secondary chamber and away from the loudspeaker;

wherein the at least one secondary chamber is configured to increase an acoustic output power of the loudspeaker by at least 5 dB in a low frequency range compared to another loudspeaker not having the at least one secondary chamber but otherwise identical to the loudspeaker; and wherein the low frequency range comprises frequencies lower than a center frequency of the fundamental output sound waves.

Example 2. The loudspeaker of Example 1, wherein the at least one secondary chambers is configured to reduce a peak response frequency of the passive radiator.

Example 3. The loudspeaker of Example 1, wherein the fundamental output sound waves comprise frequencies from 1000 Hz to 5000 Hz.

Example 4. The loudspeaker of Example 1, wherein the fundamental output sound waves comprise frequencies from 100 Hz to 1000 Hz.

Example 5. The loudspeaker of Example 1, wherein the fundamental output sound waves comprise frequencies from 10 Hz to 100 Hz.

Example 6. The loudspeaker of Example 1, wherein the output area is smaller than or equal to 30% of the effective area.

Example 7. The loudspeaker of Example 6, wherein the output area is smaller than or equal to 20% of the effective area.

Example 8. The loudspeaker of Example 1, wherein the effective area of the passive radiator is larger than 130% of an area of the at least one speaker driver.

Example 9. The loudspeaker of Example 8, wherein the effective areas of the passive radiator is larger than 200% of the area of the at least one speaker driver.

Example 10. The loudspeaker of Example 1, wherein the at least one secondary chamber increases the acoustic output power of the loudspeaker at the low frequency range by at least 5 dB compared to the another loudspeaker.

Example 11. The loudspeaker of Example 10, wherein the low frequency range comprises at least frequencies from 40 Hz to 60 Hz.

Example 12. The loudspeaker of Example 1, wherein a cross-sectional area of the at least one secondary chamber along a longitudinal path extending from a back wall of the at least one secondary chamber or from the passive radiator, to the at least one output port does not exceed 30% of the effective area, wherein the cross-section area comprises an area in a plane perpendicular to the longitudinal path.

Example 13. The loudspeaker of Example 12, wherein the cross-sectional area of the at least one secondary chamber along the longitudinal path extending from a back wall of the at least one secondary chamber or from the passive radiator, to the at least one output port is greater than 5% of the effective area.

Example 14. The loudspeaker of Example 12, wherein the cross-sectional area of the at least one secondary chamber is tapered along at least a portion of the longitudinal path.

Example 15. The loudspeaker of Example 14, wherein the cross-sectional area monotonically increases along at least a portion of the longitudinal path extending from a back wall of the secondary chamber or from the passive radiator, to the at least one output port.

Example 16. The loudspeaker of Example 1, wherein the primary chamber comprises a front wall on which the at least one speaker driver is mounted and at least one joint wall shared between the primary and the at least one secondary chambers, on which the at least one passive radiator is mounted.

Example 17. The loudspeaker of Example 16, wherein the primary chamber has a first length longitudinally extended from a back wall of the primary chamber to the front wall and the secondary chamber has a second length longitudinally extended from a back wall of the at least one secondary chamber to the at least one output port.

Example 18. The loudspeaker of Example 17, wherein the second length is substantially equal to the first length.

Example 19. The loudspeaker of Example 17, wherein the second length is longer than the first length.

Example 20. The loudspeaker of any of Examples 17 or 19, wherein the primary chamber has a first width along a lateral direction parallel to the joint wall and the font wall, and the secondary chamber has a second width along the lateral direction.

Example 21. The loudspeaker of Example 20 wherein the first width is substantially equal to the second width.

Example 22. The loudspeaker of Example 20, wherein the first width is smaller than the second width.

Example 23. The loudspeaker of any of Examples 17 to 22, wherein the at least one secondary chamber comprises a folded longitudinal path extended from the at least one passive radiator to the at least one output port, wherein the folded longitudinal path is longer than the second length.

Example 24. The loudspeaker of any of Examples 1-23, wherein the at least one output port comprises a first output port having a first output area and a second output port having a second output area.

Example 25. The loudspeaker of Example 24, wherein the at least one secondary chamber surrounds the primary chamber.

Example 26. The loudspeaker of any of Examples 24 or 25 wherein the first and the second output areas are smaller than or equal to 30% of the effective area.

Example 27. The loudspeaker of Example 24, wherein the at least one secondary chamber comprises a first secondary chamber comprising the first output port and a second secondary chamber comprising the second output port.

Example 28. The loudspeaker of Example 27, wherein the at least one passive radiator comprises a first passive radiator acoustically coupling the first secondary chamber to the primary chamber and a second passive radiator acoustically coupling the second secondary chamber to the primary chamber, and wherein the first and second passive radiators have a first and a second effective area, respectively.

Example 29. The loudspeaker of Example 28, wherein the first and the second output areas are smaller than or equal to 30% of the first effective area and the second effective area.

Example 30. The loudspeaker of any of Examples 24-29, wherein the first and the second output areas are larger than 130% of an area of the at least one speaker driver.

Example 31. The loudspeaker of any of Examples 1-29 where the at least one speaker driver comprises two identical speaker drivers.

Example 32. The loudspeaker of any of Examples 24-30, wherein the second output area is substantially equal to the first output area.

Example 33. The loudspeaker of Example 1, wherein the center frequency of the fundamental output sound waves is from 10 Hz to 50 Hz.

Example 34. The loudspeaker of Example 1, wherein the center frequency of the fundamental output sound waves is from 50 Hz to 100 Hz.

Example 35. The loudspeaker of Example 1, wherein the center frequency of the fundamental output sound waves is from 100 Hz to 500 Hz.

Example 36. The loudspeaker of Example 1, wherein the center frequency of the fundamental output sound waves is from 500 Hz to 2000 Hz.

Example 37. The loudspeaker of Example 1, wherein the center frequency of the fundamental output sound waves is from 2000 Hz to 5000 Hz.

Example 38. The loudspeaker of Example 1, wherein the passive radiator forms a permeable seal between the primary chamber and the secondary chamber, wherein the permeable seal is configured to maintain air pressure inside the primary chambers within a specified range while blocking moisture from entering the primary chamber.

Example 39. The loudspeaker of Example 38, wherein the permeable seal comprises a membrane disposed in the loudspeaker, wherein the membrane is configured to blocks water and particles while allowing air to flow between the primary and the secondary chambers.

Example 40. The loudspeaker of Example 39, wherein the permeable seal in configured to equalize an air pressure within the primary chamber with an atmospheric pressure outside the primary chamber.

What is claimed is:

1. A loudspeaker configured to generate sound waves, the loudspeaker comprising:

a primary chamber comprising at least one speaker driver that generates sound waves, radiates a first portion of the sound waves away from the primary chamber, and radiates a second portion of the sound waves into the primary chamber, wherein the first portion of the sound waves comprises fundamental output sound waves;

at least one passive radiator having an effective area configured to radiate intermediate sound waves associated with the second portion of the sound waves; and at least one secondary chamber acoustically coupled to the primary chamber via the at least one passive radiator, the at least one secondary chamber comprising at least one output port having an output area, at least one output port configured to allow radiation of intermediate sound waves received from the at least one passive radiator out of the at least one secondary chamber and away from the loudspeaker;

wherein the at least one secondary chamber is configured to increase an acoustic output power of the loudspeaker by at least 5 dB in a low frequency range compared to another loudspeaker not having the at least one secondary chamber but otherwise identical to the loudspeaker; and wherein the low frequency range comprises frequencies lower than a center frequency of the fundamental output sound waves.

2. The loudspeaker of claim 1, wherein the at least one secondary chamber is configured to reduce a peak response frequency of the at least one passive radiator.

3. The loudspeaker of claim 1, wherein the fundamental output sound waves comprise frequencies from 1000 Hz to 5000 Hz.

4. The loudspeaker of claim 1, wherein the fundamental output sound waves comprise frequencies from 100 Hz to 1000 Hz.

5. The loudspeaker of claim 1, wherein the fundamental output sound waves comprise frequencies from 10 Hz to 100 Hz.

6. The loudspeaker of claim 1, wherein the output area is smaller than or equal to 38% of the effective area.

7. The loudspeaker of claim 6, wherein the output area is smaller than or equal to 30% of the effective area.

8. The loudspeaker of claim 1, wherein the effective area of the at least one passive radiator is larger than 130% of an area of the at least one speaker driver.

9. The loudspeaker of claim 8, wherein the effective area of the at least one passive radiator is larger than 200% of the area of the at least one speaker driver.

10. The loudspeaker of claim 1, wherein the at least one secondary chamber increases the acoustic output power of the loudspeaker at the low frequency range by at least 5 dB compared to the another loudspeaker.

11. The loudspeaker of claim 10, wherein the low frequency range comprises at least frequencies from 40 Hz to 60 Hz.

12. The loudspeaker of claim 1, wherein a cross-sectional area of the at least one secondary chamber along a longitudinal path extending from a back wall of the at least one secondary chamber or from the at least one passive radiator, to the at least one output port does not exceed 38% of the effective area, wherein the cross-sectional area comprises an area in a plane perpendicular to the longitudinal path.

13. The loudspeaker of claim 12, wherein the cross-sectional area of the at least one secondary chamber along the longitudinal path extending from a back wall of the at least one secondary chamber or from the at least one passive radiator, to the at least one output port is greater than 5% of the effective area.

14. The loudspeaker of claim 12, wherein the cross-sectional area of the at least one secondary chamber is tapered along at least a portion of the longitudinal path.

15. The loudspeaker of claim 14, wherein the cross-sectional area monotonically increases along at least a portion of the longitudinal path extending from a back wall of the at least one secondary chamber or from the at least one passive radiator, to the at least one output port.

16. The loudspeaker of claim 1, wherein the primary chamber comprises a front wall on which the at least one speaker driver is mounted and at least one joint wall shared between the primary and the at least one secondary chambers, on which the at least one passive radiator is mounted.

17. The loudspeaker of claim 16, wherein the primary chamber has a first length longitudinally extended from a back wall of the primary chamber to the front wall and the at least one secondary chamber has a second length longitudinally extended from a back wall of the at least one secondary chamber to the at least one output port.

18. The loudspeaker of claim 17, wherein the second length is substantially equal to the first length.

19. The loudspeaker of claim 17, wherein the second length is longer than the first length.

20. The loudspeaker of claim 17, wherein the primary chamber has a first width along a lateral direction parallel to the at least one joint wall and the front wall, and the at least one secondary chamber has a second width along the lateral direction.

21. The loudspeaker of claim 20 wherein the first width is substantially equal to the second width.

22. The loudspeaker of claim 20, wherein the first width is smaller than the second width.

23. The loudspeaker of claim 17, wherein the at least one secondary chamber comprises a folded longitudinal path extended from the at least one passive radiator to the at least one output port, wherein the folded longitudinal path is longer than the second length.

24. The loudspeaker of claim 1, wherein the at least one output port comprises a first output port having a first output area and a second output port having a second output area.

25. The loudspeaker of claim 24, wherein the at least one secondary chamber surrounds the primary chamber.

26. The loudspeaker of claim 24 wherein the first and the second output areas are smaller than or equal to 38% of the effective area.

27. The loudspeaker of claim 24, wherein the at least one secondary chamber comprises a first secondary chamber comprising the first output port and a second secondary chamber comprising the second output port.

28. The loudspeaker of claim 27, wherein the at least one passive radiator comprises a first passive radiator acoustically coupling the first secondary chamber to the primary chamber and a second passive radiator acoustically coupling the second secondary chamber to the primary chamber, and wherein the first and second passive radiators have a first and a second effective area, respectively.

29. The loudspeaker of claim 28, wherein the first and the second output areas are smaller than or equal to 30% of the first effective area and the second effective area.

30. The loudspeaker of claim 24, wherein the first and the second output areas are larger than 130% of an area of the at least one speaker driver.

31. The loudspeaker of claim 1, wherein the at least one speaker driver comprises two identical speaker drivers.

32. The loudspeaker of claim 24, wherein the second output area is substantially equal to the first output area.

33. The loudspeaker of claim 1, wherein the center frequency of the fundamental output sound waves is from 10 Hz to 50 Hz.

34. The loudspeaker of claim 1, wherein the center frequency of the fundamental output sound waves is from 50 Hz to 100 Hz.

35. The loudspeaker of claim 1, wherein the center frequency of the fundamental output sound waves is from 100 Hz to 500 Hz.

36. The loudspeaker of claim 1, wherein the center frequency of the fundamental output sound waves is from 500 Hz to 2000 Hz.

37. The loudspeaker of claim 1, wherein the center frequency of the fundamental output sound waves is from 2000 Hz to 5000 Hz.

38. The loudspeaker of claim 1, wherein the at least one passive radiator forms a permeable seal between the primary chamber and the at least one secondary chamber, wherein the permeable seal is configured to maintain air pressure inside the primary chamber within a specified range while blocking moisture from entering the primary chamber.

39. The loudspeaker of claim 38, wherein the permeable seal comprises a membrane disposed in the loudspeaker, wherein the membrane is configured to blocks water and particles while allowing air to flow between the primary and the at least one secondary chambers.

40. The loudspeaker of claim 39, wherein the permeable seal in configured to equalize an air pressure within the primary chamber with an atmospheric pressure outside the primary chamber.

* * * * *